(12) United States Patent
Butler et al.

(10) Patent No.: US 7,492,851 B2
(45) Date of Patent: Feb. 17, 2009

(54) CLAMP FOR FEEDWATER SPARGER END BRACKET ASSEMBLIES AND METHOD OF PREVENTING SEPARATION OF FEEDWATER SPARGER END BRACKET ASSEMBLIES

(75) Inventors: Patrick J. Butler, Alexandria, VA (US); H. William McCurdy, Oakton, VA (US)

(73) Assignee: MPR Associates, Inc., Alexandria, VA (US)

( * ) Notice: Subject to any disclaimer, the term of this patent is extended or adjusted under 35 U.S.C. 154(b) by 0 days.

(21) Appl. No.: 11/387,146

(22) Filed: Mar. 22, 2006

(65) Prior Publication Data
US 2006/0193424 A1 Aug. 31, 2006

Related U.S. Application Data

(62) Division of application No. 10/059,044, filed on Jan. 30, 2002, now abandoned.

(60) Provisional application No. 60/264,965, filed on Jan. 30, 2001.

(51) Int. Cl.
*G21C 9/00* (2006.01)
(52) U.S. Cl. .................. 376/277; 376/282; 376/283
(58) Field of Classification Search ............ 29/560.1; 376/260, 277, 282, 283
See application file for complete search history.

(56) References Cited

U.S. PATENT DOCUMENTS

| | | | |
|---|---|---|---|
| 2,547,932 A | 4/1951 | Downs, Jr. | |
| 3,233,907 A * | 2/1966 | Stanton | 277/616 |
| 4,804,158 A | 2/1989 | Collins et al. | |
| 4,859,403 A | 8/1989 | Dixon et al. | |
| 5,022,684 A * | 6/1991 | Eagon | 285/12 |
| 5,237,909 A | 8/1993 | Pirhadi | |
| 5,392,322 A * | 2/1995 | Whitling et al. | 376/260 |
| 5,600,690 A * | 2/1997 | Weems et al. | 376/302 |
| 5,646,969 A * | 7/1997 | Jensen | 376/260 |
| 5,752,807 A | 5/1998 | Erbes | |
| 5,819,425 A * | 10/1998 | Payne | 33/370 |
| 5,839,192 A * | 11/1998 | Weems et al. | 29/890.031 |
| 5,964,029 A * | 10/1999 | Weems et al. | 29/723 |
| 6,108,391 A * | 8/2000 | Deaver et al. | 376/262 |
| 6,264,203 B1 * | 7/2001 | Weems et al. | 277/314 |
| 6,293,593 B1 | 9/2001 | Wivagg | |
| 6,375,130 B1 | 4/2002 | Jensen et al. | |
| 6,390,509 B1 | 5/2002 | Wivagg | |
| 6,456,682 B1 * | 9/2002 | Jensen | 376/282 |
| 6,481,757 B1 * | 11/2002 | Pao et al. | 285/125.1 |

* cited by examiner

Primary Examiner—Rick Palabrica

(57) ABSTRACT

A constrained feedwater sparger end bracket assembly comprises a boiling water reactor vessel, a feedwater sparger including a conduit within the vessel, a feedwater sparger end bracket assembly connected to an end of the conduit at a sparger/bracket junction, and a clamp secured on the feedwater sparger end bracket assembly. The clamp constrains the feedwater sparger end bracket assembly in directions horizontal, vertical and radial to the vessel.

20 Claims, 11 Drawing Sheets

CLAMP FOR FEEDWATER SPARGER END BRACKET ASSEMBLIES AND METHOD OF PREVENTING SEPARATION OF FEEDWATER SPARGER END BRACKET ASSEMBLIES

CROSS-REFERENCE TO RELATED PATENT APPLICATIONS

This application is a divisional of prior U.S. patent application Ser. No. 10/059,044 filed Jan. 30, 2002, now abandoned which claims priority from prior provisional patent application Ser. No. 60/264,965 filed Jan. 30, 2001, the entire disclosures of which are incorporated herein by reference.

BACKGROUND OF THE INVENTION

1. Field of the Invention

The present invention relates to feedwater spargers in boiling water reactors and, more particularly, to clamps for the end bracket assemblies of feedwater spargers and to methods of preventing separation of feedwater sparger end bracket assemblies.

2. Brief Discussion of the Related Art

Conventional boiling water reactors typically include a reactor vessel, a shroud disposed within the reactor vessel and a fuel assembly within the shroud. Feedwater enters the reactor vessel via a feedwater inlet or nozzle and is distributed circumferentially within the reactor vessel by a feedwater sparger disposed in the reactor vessel between the shroud and the reactor vessel wall. The feedwater sparger comprises a ring-shaped pipe or conduit for carrying the feedwater and having an end attached to a sparger end plate via a feedwater sparger end weld, the sparger end plate and conduit end attached thereto defining an end of the feedwater sparger. A feedwater sparger end bracket assembly couples the end of the feedwater sparger to the reactor vessel wall in spaced relation therewith. The feedwater sparger end bracket assembly normally comprises an attachment plate connected to the sparger end plate via a weld, and the structural components of the feedwater sparger end bracket assembly are ordinarily connected to one another via one or more additional welds. The attachment plate and the sparger end plate attached thereto form a sparger/bracket junction by which the conduit of the feedwater sparger is connected to the feedwater sparger end bracket assembly. The feedwater sparger end bracket assembly defines a load path for transferring loads from the feedwater sparger to a reactor vessel attachment fitting attached to the reactor vessel wall and to which the feedwater sparger end bracket assembly is connected. The structural adequacy of feedwater sparger end welds and feedwater sparger end bracket assembly welds has been questioned in light of cracking identified in these welds. In particular, the weld between the attachment plate and the sparger end plate and the weld between the sparger end plate and the conduit end are primarily fillet welds, and reactor coolant can infiltrate or get between the structural components joined by these fillet welds so that the roots of the fillet welds are exposed to reactor coolant. The geometry of the fillet welds presents a crevice where corrosive products can concentrate and accumulate over time, thereby producing stress corrosion cracking.

Cracks large enough to allow significant flow of feedwater from the feedwater sparger may result in direct impingement of the relatively colder feedwater on the reactor vessel wall, causing thermal shock and cracking of the cladding on the interior surface of the reactor vessel wall. In addition, the feedwater sparger end bracket assemblies usually carry an installation preload, and this preload is undesirably compromised or lost in the event of cracking of the feedwater sparger end welds and/or the feedwater sparger end bracket assembly welds, especially in the event of cracking which results in complete detachment of the feedwater sparger end bracket assembly from the feedwater sparger. An example of feedwater sparger end bracket assemblies that have an installation preload are those associated with feedwater spargers that are sprung into place during installation, such as to maintain contact between flow baffles of the feedwater spargers and the reactor vessel wall. The flow baffles, which are ordinarily located at the feedwater nozzles in the reactor vessel, must remain essentially in contact with the reactor vessel wall to effectively eliminate thermal shock conditions at the feedwater nozzles. To assure this, the feedwater spargers are sprung into place at installation, resulting in an installation preload on each feedwater sparger end bracket assembly of about eight thousand pounds. In the event of complete weld failure causing the feedwater spargers to become completely detached from the feedwater sparger end bracket assemblies, the installation preload is lost and the feedwater spargers will not perform as designed.

Mechanical solutions to the problems of cracked feedwater sparger end welds and feedwater sparger end bracket assembly welds encounter numerous obstacles in that mechanical devices attached to the ends of the feedwater spargers and the feedwater sparger end bracket assemblies must be capable of maintaining the installation preload in the event of weld failure. Mechanical devices must be capable of balancing all loads and moments to which they are subjected, and particularly must react to the loads and moments created when there is a complete through wall crack of the feedwater sparger end welds and/or the welds of the feedwater sparger end bracket assemblies. Another deterrent to the use of mechanical devices to address the problems of weld failure in the ends of feedwater spargers and in feedwater sparger end bracket assemblies is that existing feedwater sparger end bracket assemblies often have different structural dimensions and/or components. The use of mechanical devices with feedwater sparger end bracket assemblies is thusly impeded by the difficulty involved in designing an essentially standard mechanical device for use with different feedwater sparger end bracket assemblies. A further impediment to the use of mechanical devices in response to cracking of feedwater sparger end welds and feedwater sparger end bracket assembly welds is the need for the mechanical devices to be installed using equipment or tooling operated from a location remote from the reactor vessel.

SUMMARY OF THE INVENTION

Accordingly, it is a primary object of the present invention to overcome the problems associated with cracking of feedwater sparger end welds and feedwater sparger end bracket assembly welds.

Another object of the present invention is to utilize a clamp to prevent separation of feedwater sparger end bracket assemblies.

A further object of the present invention is to utilize a clamp to prevent separation of a feedwater sparger end from a feedwater sparger end bracket assembly welded to the feedwater sparger end.

The present invention has as another object to constrain a feedwater sparger end bracket assembly from separation in horizontal, vertical and radial directions.

It is also an object of the present invention to constrain a feedwater sparger end against separation from a feedwater sparger end bracket assembly in horizontal, vertical and radial directions.

An additional object of the present invention is to avoid direct impingement of feedwater from a feedwater sparger on the reactor vessel wall in the event of cracking of a feedwater sparger end weld and/or a feedwater sparger end bracket assembly weld.

Yet another object of the present invention is to maintain the preload of a feedwater sparger end bracket assembly in the event of failure of a feedwater sparger end weld and/or a feedwater sparger end bracket assembly weld.

Still a further object of the present invention is to balance loads and moments on a clamp for a feedwater sparger end bracket assembly in the event of failure of a feedwater sparger end weld and/or a feedwater sparger end bracket assembly weld.

The present invention has as an additional object to adapt a clamp for installation on feedwater sparger end bracket assemblies of various structural dimensions and/or components.

Moreover, it is an object of the present invention to utilize a clamp to provide an alternate load path for loads from a feedwater sparger to a reactor vessel attachment fitting.

Some of the advantages of the present invention are that the clamp can be adjustably tightened on the feedwater sparger end bracket assembly; the clamp encloses the feedwater sparger end bracket assembly; the clamp holds the feedwater sparger and the feedwater sparger end bracket assembly together in the event of weld failure in any of the welds of the feedwater sparger and/or the feedwater sparger end bracket assembly; the clamp incorporates corrosion resistant materials; the clamp does not require welding to the feedwater sparger end, to the feedwater sparger end bracket assembly or to the reactor vessel; thermal shock and cracking of the cladding on the interior surface of the reactor vessel wall are avoided; the moment created on the clamp in the event of through wall cracking of a feedwater sparger end weld and/or a feedwater sparger end bracket assembly weld is balanced; shims and/or spacers can be used to easily adapt the clamp for installation on feedwater sparger end bracket assemblies having different structural dimensions and/or components; clearances between the clamp and the feedwater sparger and/or between the clamp and the feedwater sparger end bracket assembly can be limited or controlled to ensure a tight fit; proper operation of flow baffles of the feedwater spargers is maintained; the clamp may be installed remotely; and the clamp may be used on both originally installed feedwater sparger end bracket assemblies and replacement feedwater sparger end bracket assemblies.

These and other objects, advantages and benefits are realized with the present invention as generally characterized in a clamp for installation on a feedwater sparger end bracket assembly connected to a conduit of a feedwater sparger at a sparger/bracket junction in a boiling water reactor vessel. The clamp includes an upper clamp member for being assembled over a top of the feedwater sparger end bracket assembly, a lower clamp member for being assembled over a bottom of the feedwater sparger end bracket assembly and a connector securing the upper and lower clamp members to one another. The upper clamp member includes a compartment receiving an upper portion of the sparger/bracket junction, and the lower clamp member includes a compartment receiving a lower portion of the sparger/bracket junction. Each compartment comprises opposing walls constraining the sparger/bracket junction in a first direction tangential or horizontal to the boiling water reactor vessel. Each clamp member includes an inner shoulder along an inner side of the feedwater sparger end bracket assembly and an outer shoulder along an outer side of the feedwater sparger end bracket assembly for constraining the feedwater sparger end bracket assembly between the inner and outer shoulders in a second direction radial to the boiling water reactor vessel. The upper clamp member includes a lower surface along the top of the feedwater sparger end bracket assembly. The lower clamp member includes an upper surface along the bottom of the feedwater sparger end bracket assembly, and the feedwater sparger end bracket assembly is constrained between the lower surface and the upper surface in a third direction vertical to the boiling water reactor vessel. The upper clamp member further includes a recessed lower surface along the top of the conduit of the feedwater sparger, and the lower clamp member further includes a recessed upper surface along the bottom of the conduit, the conduit being constrained in the third direction between the recessed lower and upper surfaces. Each clamp member includes a shear tab positioned to be disposed between the conduit of the feedwater sparger and a wall of the boiling water reactor vessel with a close fit. The shear tab balances moments and loads to which the clamp is subjected. The upper clamp member comprises an impingement shield extending downwardly therefrom toward the lower clamp member, and the lower clamp member comprises an impingement shield extending upwardly to meet the impingement shield of the upper clamp member. The impingement shields are disposed between the sparger/bracket junction and the wall of the boiling water reactor vessel and serve to isolate the sparger/bracket junction from the wall of the boiling water reactor vessel.

A method of preventing separation of a feedwater sparger end bracket assembly connected to a conduit of a feedwater sparger at a sparger/bracket junction in a boiling water reactor vessel is generally characterized in the steps of vertically separating an upper clamp member of a clamp from a lower clamp member of the clamp, locating the upper clamp member over a top of the feedwater sparger end bracket assembly, locating the lower clamp member over a bottom of the feedwater sparger end bracket assembly, moving the upper and lower clamp members toward one another to position an upper portion of the sparger/bracket junction within a compartment of the upper clamp member and to position a lower portion of the sparger/bracket junction within a compartment of the lower clamp member, securing the upper and lower clamp members to one another, and leaving the upper and lower clamp members in place to constrain the sparger/bracket junction in a first direction, to constrain the feedwater sparger end bracket assembly in a second direction, and to constrain the feedwater sparger end bracket assembly in a third direction. A feedwater sparger end bracket assembly that has the clamp installed thereon constitutes a constrained feedwater sparger end bracket assembly.

Other objects and advantages of the present invention will become apparent from the following description of a preferred embodiment taken in conjunction with the accompanying drawings, wherein like parts in each of the several figures are identified by the same reference characters.

DESCRIPTION OF THE PREFERRED EMBODIMENT

Figure 1:
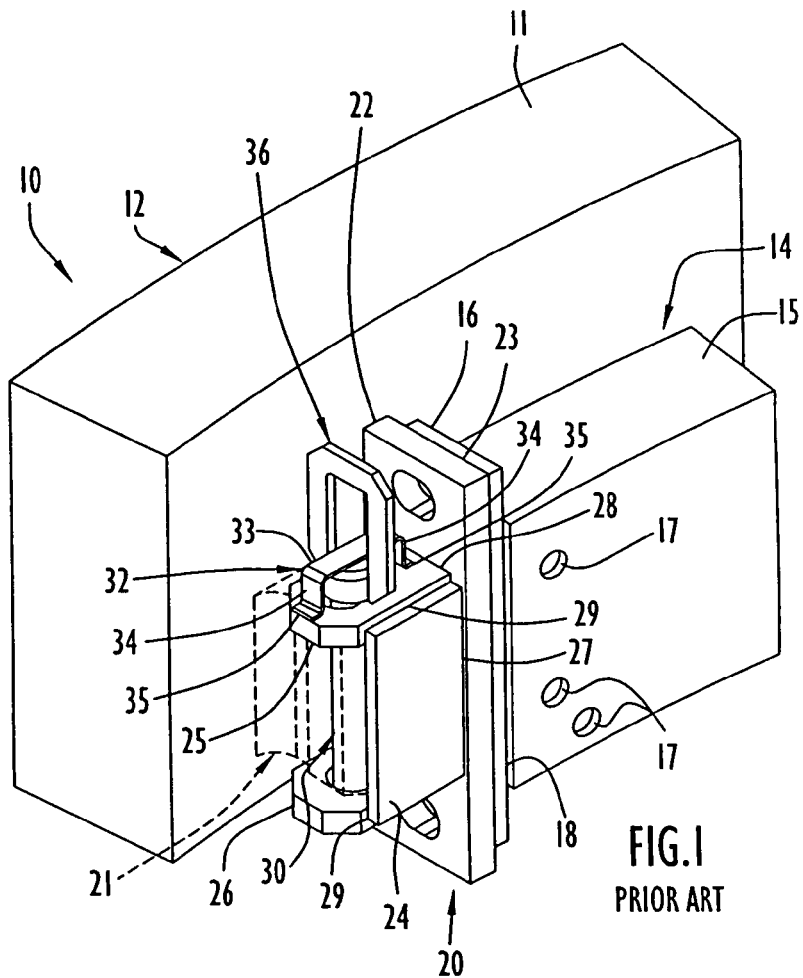
FIG. 1 is a front perspective view depicting a portion of a reactor vessel of a boiling water reactor and illustrating a feedwater sparger end bracket assembly attached to an end of a feedwater sparger of the boiling water reactor.

A fragmentary portion of a conventional boiling water reactor 10 is illustrated in FIGS. 1-4 depicting a segment of a wall 11 of reactor vessel 12 and a length segment of feedwater sparger 14 disposed within reactor vessel 12. The reactor vessel wall 11 is generally cylindrical, and the complete reactor vessel wall extends upwardly, downwardly and circumferentially beyond the edges or borders of the wall segment shown in the drawings. A shroud (not shown) is disposed in the reactor vessel 12 in spaced relation with wall 11, and the feedwater sparger 14 is disposed in the circumferential gap or space between the shroud and the reactor vessel wall. The feedwater sparger 14 comprises a hollow conduit or pipe 15 that generally follows the circumferential curvature of the reactor vessel wall 11 and has a terminal end connected to a sparger end plate 16. The complete conduit 15 forms an annular or ring-shaped conduit or pipe in the reactor vessel 12 for carrying feedwater which enters the reactor vessel at one or more feedwater inlets or nozzles in communication with the lumen of conduit 15. The feedwater is distributed circumferentially within the reactor vessel 12 via interiorly directed outlet holes 17 in the conduit 15. A representative conduit 15 has concentric circumferential inner and outer side walls connected by planar top and bottom walls, with the holes 17 being formed in the inner side wall. The conduit 15 has a rectangular cross-sectional configuration with the major cross-sectional dimension thereof extending or oriented vertically in the reactor vessel 12 and the minor cross-sectional dimension thereof extending or oriented radially in the reactor vessel 12.

A representative sparger end plate 16 is planar and is of generally rectangular peripheral configuration with the major dimension thereof also extending or oriented vertically to close off the open end of conduit 15. The sparger end plate 16 is typically attached to the end of conduit 15 by a feedwater sparger end weld 18, and the conduit end and the sparger end plate attached thereto define an end of feedwater sparger 14. The sparger end plate 16 is connected to a feedwater sparger end bracket assembly 20 which, in turn, is connected to a reactor vessel attachment fitting 21 connected, typically by welding, to reactor vessel wall 11. The feedwater sparger end bracket assembly 20 thusly couples the end of the feedwater sparger 14 to the reactor vessel 12 in spaced relation with reactor vessel wall 11. Accordingly, there is a circumferential gap or space between the feedwater sparger 14 and the reactor vessel wall 11 as best shown in FIG. 4.

As used herein, the terms "top", "bottom", "upper", "lower", "upward" and "downward" are referenced in a vertical direction; the terms "inner" and "interior" refer to a direction toward a central longitudinal axis of the reactor vessel; the terms "outer" and "exterior" refer to a direction away from the central longitudinal axis of the reactor vessel; the terms "front" and "forward" refer to a direction away from the conduit end; the terms "back" and "rearward" refer to a direction toward the conduit end; the term "vertical" refers to the direction of the central longitudinal axis of the reactor vessel; the term "radial" refers to a direction radial to the reactor vessel wall; and the terms "horizontal" and "tangential" refer to a direction transverse or perpendicular to the vertical and radial directions.

Figure 2:
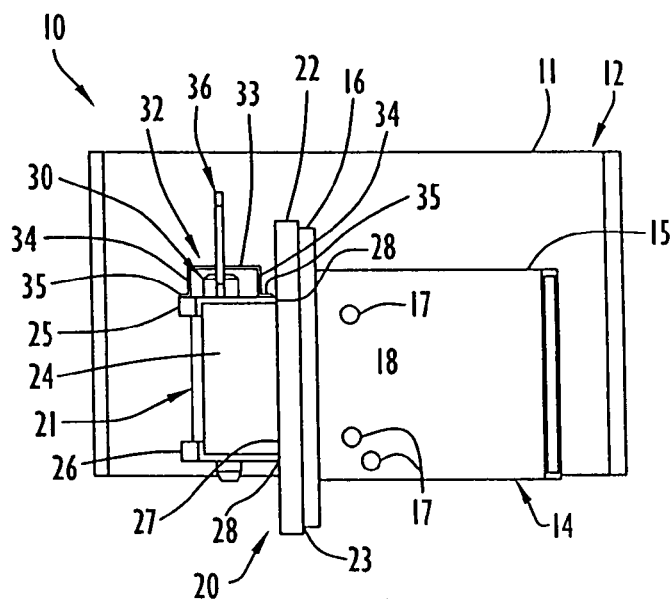
FIG. 2 is an inner side view of the feedwater sparger end bracket assembly illustrated in FIG. 1.
Figure 3:
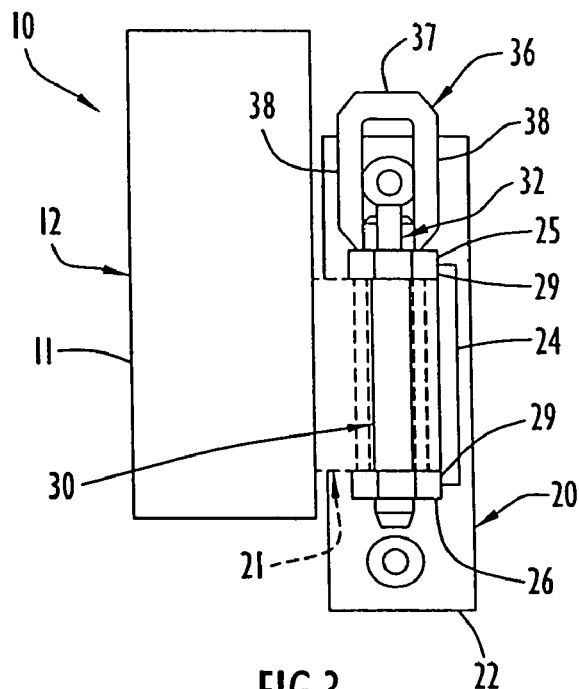
FIG. 3 is a front view of the feedwater sparger end bracket assembly illustrated in FIG. 1.
Figure 4:
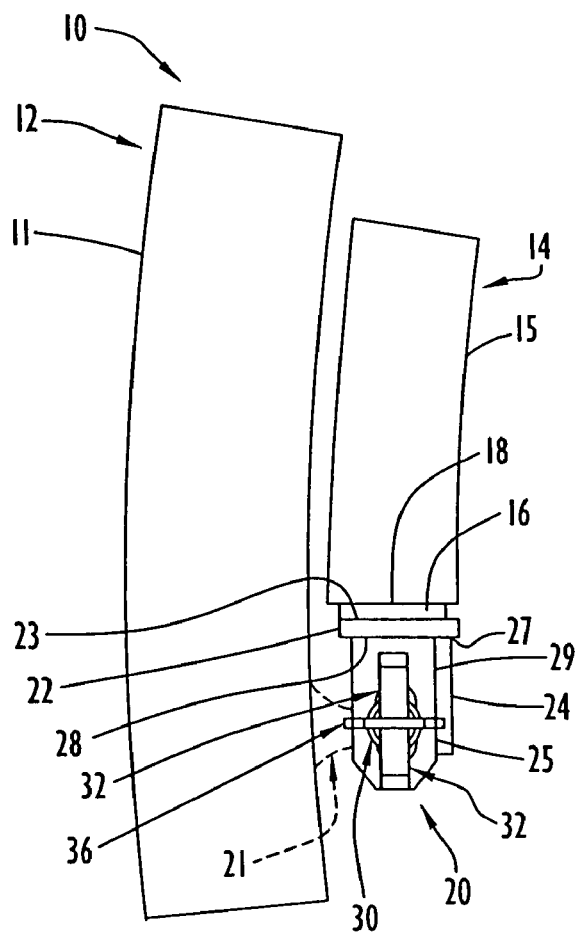
FIG. 4 is a top view of the feedwater sparger end bracket assembly illustrated in FIG. 1.

As shown in FIGS. 1-5, the feedwater sparger end bracket assembly 20 for a conventional boiling water reactor 10 ordinarily comprises an attachment plate 22 connected to sparger end plate 16 by a weld 23, a side plate 24 connected to attachment plate 22 and extending transversely or perpendicularly therefrom in the forward direction, and upper and lower bracket members 25 and 26, respectively, extending from attachment plate 22 in the forward direction. A representative attachment plate 22 is planar and is of generally rectangular peripheral configuration with the major dimension thereof extending vertically within the reactor vessel 12 and the minor dimension thereof extending radially in the reactor vessel 12. The peripheral configuration of the attachment plate 22 is larger than the peripheral configuration of the sparger end plate 16 such that the sparger end plate does not protrude beyond the periphery of the attachment plate. As best shown in FIG. 4, it is typical for an inner side edge of attachment plate 22 to be spaced interiorly beyond an inner side edge of sparger end plate 16. The attachment plate 22 is parallel to the sparger end plate 16 and has a rearward surface in facing abutment with a forward surface of the sparger end plate, the weld 23 being disposed between the abutting surfaces of the attachment plate and the sparger end plate. The attachment plate and sparger end plate may be provided with through holes to facilitate grasping thereof during installation, the attachment plate 22 being shown with upper and lower through holes aligned with upper and lower through holes of sparger end plate 16.

A representative side plate 24 has a straight rearward edge in facing abutment with a forward surface of the attachment plate 22. A weld 27 is disposed between the abutting surfaces of the side plate 24 and the attachment plate 22 and thusly connects the side plate to the attachment plate. The side plate 24 is connected to the attachment plate 22 at a location adjacent or close to the inner side edge of attachment plate 22. The side plate 24 is planar and has a generally rectangular peripheral configuration with the major dimension thereof extending vertically in the reactor vessel 12 and the minor dimension thereof extending perpendicular to the attachment plate.

Representative upper and lower bracket members 25 and 26 are also planar, and each bracket member has a straight rearward edge, a beveled forward edge, and parallel inner and outer straight side edges connecting the forward and rearward edges. The rearward edges of the upper and lower bracket members 25 and 26 are each in facing abutment with the forward surface of attachment plate 22, with the bracket members 25 and 26 being perpendicular to the side plate 24 and to the attachment plate 22. Welds 28 connect the abutting surfaces of the upper and lower bracket members 25 and 26, respectively, and the attachment plate 22. The straight inner side edge of each bracket member is in abutting relation with an outer surface of the side plate 24, and welds 29 connect the abutting surfaces of the upper and lower bracket members 25 and 26, respectively, and the side plate 24. The upper and lower bracket members 25 and 26 are parallel to and vertically spaced from one another to closely accommodate the reactor vessel attachment fitting 21 between a lower surface of the upper bracket member 25 and an upper surface of the lower bracket member 26. Accordingly, the inner side edge of upper bracket member 25 is connected to the side plate 24 at a location adjacent or close to an upper edge of side plate 24, and the inner side edge of lower bracket member 26 is connected to the side plate 24 at a location adjacent or close to a lower edge of the side plate 24.

The representative feedwater sparger end bracket assembly 20 also includes a pin 30, extending through the upper and lower bracket members 25 and 26 and through the reactor vessel attachment fitting 21, by which the feedwater sparger end bracket assembly is secured or pinned to the reactor vessel attachment fitting. The pin 30 extends in the vertical direction transverse or perpendicular to the upper and lower bracket members 25 and 26, and is inserted through aligned passages in the upper and lower bracket members and the reactor vessel attachment fitting 21. An upper end or head of the pin 30 is disposed above the upper bracket member 25 and is sized and/or configured such that the head cannot pass through the passage in the upper bracket member 25. The passages in the upper and lower bracket members 25 and 36 are ordinarily oval or elliptical in cross-section and have centers, respectively, located centrally between the inner and outer side edges of the corresponding bracket member.

A pin retainer 32 is engaged with or secured to the upper bracket member 25 and, as best seen in FIGS. 1 and 2, includes a bridge 33 centered over the head of pin 30 and a pair of legs 34 extending downwardly from opposite ends of bridge 33 to feet 35. The bridge 33 bisects the head of pin 30, and the legs 34 are spaced from one another a sufficient distance to accommodate the head of pin 30 therebetween. The representative pin retainer 32 is located so that the bridge 33 is perpendicular to the attachment plate 22 and parallel to the upper bracket member 25, with the legs 34 extending perpendicular to the bridge 33. The feet 35 extend outwardly from the legs 34, respectively, and are secured to or engaged with the upper bracket member 25 to prevent removal of the pin 30 after it has been inserted sequentially through the passage of the upper bracket member 25, the passage of the reactor vessel attachment fitting 21 and the passage of the lower bracket member 26. In a representative pin retainer 32, the feet 35 extend perpendicular to legs 34 such that the feet 35 are also perpendicular to the attachment plate 22. The representative pin retainer 32 is formed from an elongated, planar strip of material of relatively minimal thickness.

Figure 5:
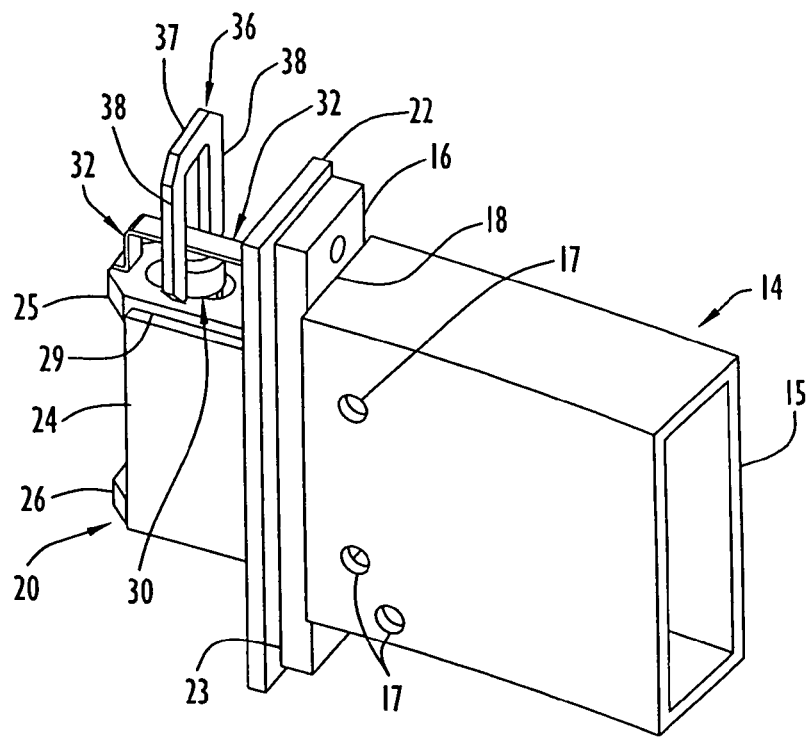
FIG. 5 is an inner side perspective view of the feedwater sparger end bracket assembly illustrated in FIG. 1 with the exception that the reactor vessel is not shown for the sake of simplicity.

A pin bail 36 of the feedwater sparger end bracket assembly 20 has a generally inverted U-shape straddling the head of pin 30. As best seen in FIGS. 3 and 5, pin bail 36 includes a cross-piece 37 extending over bridge 33 perpendicular thereto and spaced, parallel arms 38 extending downwardly from opposite ends of cross-piece 37 to tapered or angled lower ends secured to the head of pin 30. The cross-piece 37 bisects the head of pin 30 along an axis 90° to bridge 33, and the lower ends of arms 38 are secured to the head of pin 30 at locations, respectively, along this axis. The representative pin bail 36 is flat or planar with beveled outside corners joining the arms 38 to opposite ends of cross-piece 37, the pin bail 36 being parallel to attachment plate 22 and perpendicular to both the side plate 24 and the upper bracket member 25. The space between arms 38 defines an opening through which the bridge 33 passes. The pin bail 36 may be used for grasping to facilitate raising and lowering of pin 30 for insertion and/or removal through the aligned passages in the upper and lower bracket members 25 and 26 and the reactor vessel attachment fitting 21 when the pin retainer 32 is not secured in place on the upper bracket member.

The reactor vessel attachment fitting 21 includes a base attached to the reactor vessel wall 11 and a nose protruding interiorly from the base in the radial direction. The nose is insertable between the upper and lower bracket members 25 and 26 when the pin 30 is removed from between the bracket members, and has a vertical dimension to fit closely between the upper and lower bracket members. A vertical passage through the nose is aligned with the aligned passages through the upper and lower bracket members 25 and 26, respectively. The pin 30 is inserted in the aligned passages, with insertion of the pin being facilitated by the pin bail 36. The pin 30 is secured in place in the aligned passages, thereby securing the feedwater sparger end bracket assembly 20 to the reactor vessel attachment fitting 21. The pin 30 may be secured in place via a threaded engagement or in any other suitable manner. The reactor vessel attachment fitting 21 can be formed integrally, unitarily with the reactor vessel wall 11 or as a separate component secured to the reactor vessel wall in any suitable manner, such as welding. The base of fitting 21 may have a curved outer end surface in abutting relation with the curved surface of the reactor vessel wall 11, and the curvature of the end surface preferably corresponds to the curvature of the reactor vessel wall. The feedwater sparger end bracket assembly 20 defines a load path for transferring loads from the feedwater sparger 14 to the reactor vessel attachment fitting 21 and the vessel wall 11.

Figure 6:
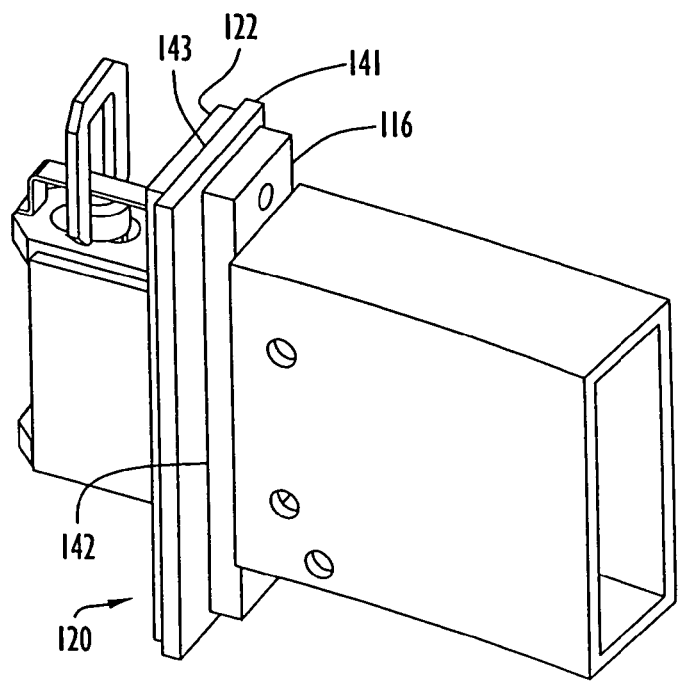
FIG. 6 is an inner side perspective view of an alternative feedwater sparger end bracket assembly attached to an end of a feedwater sparger, with the reactor vessel not being shown for the sake of simplicity.

An alternative representative feedwater sparger end bracket assembly for use with the clamp of the present invention is illustrated in FIG. 6 at 120. The feedwater sparger end bracket assembly 120 is similar to feedwater sparger end bracket assembly 20 except that the feedwater sparger end bracket assembly 120 includes a shim plate 141 between the sparger end plate 116 and the attachment plate 122. Shim plate 141 is interposed between the forward surface of the sparger end plate 116 and the rearward surface of the attachment plate 122. The representative shim plate 141 is planar and has a generally rectangular peripheral configuration with a major dimension oriented vertically within the reactor vessel, which is not shown in FIG. 6. The peripheral configuration of shim plate 141 is typically larger than the peripheral configuration of both the sparger end plate 116 and the attachment plate 122 so that both the sparger end plate and the attachment plate are disposed within the peripheral configuration of the shim plate. The shim plate 141 has a planar rearward surface in abutting relation with the forward surface of the sparger end plate 116, and a weld 142 disposed between the abutting surfaces of the shim plate and the sparger end plate connects the shim plate to the sparger end plate. The shim plate 141 has a planar forward surface in abutting relation with the rearward surface of the attachment plate 122, and a weld 143 disposed between the abutting surfaces of the shim plate and the attachment plate connects the shim plate to the attachment plate. The additional welds 142 and 143 of the feedwater sparger end bracket assembly 120 present additional potential sites for stress corrosion cracking and concomitant weld failure in the feedwater sparger end bracket assembly 120.

From the above, it should be appreciated that the feedwater sparger end bracket assemblies with which the clamp of the present invention may be utilized can include one or more shim plates, such as shim plate 141, to achieve proper fit of the feedwater sparger end bracket assembly with the corresponding reactor vessel attachment fitting. It should be further appreciated that proper fit of the feedwater sparger end bracket assembly with the corresponding reactor vessel attachment fitting may be achieved by varying the thickness of the attachment plate and/or the thickness of the sparger end plate, with or without the use of one or more shim plates. Where a stock thickness for the attachment plate is not sufficient to allow proper fit of the feedwater sparger end bracket assembly with the reactor vessel attachment fitting, one or more shim plates will typically be utilized to make the necessary adjustments. The radial and vertical locations of the attachment plate relative to the sparger end plate may also be varied, as needed, to obtain the proper fit. Since the reactor vessel for a typical boiling water reactor has a plurality of feedwater sparger end bracket assemblies, most typically eight feedwater sparger end bracket assemblies, it can be seen that the combined thickness of the sparger end plate and the attachment plate, including any shim plates, may vary. In other words, the thickness of the sparger/bracket junction, which includes the sparger end plate, the attachment plate and any shim plates, may not be the same for each feedwater sparger end bracket assembly of a boiling water reactor. The clamp of the present invention may be adapted for use on sparger/bracket junctions of different thicknesses, and may be used on originally installed feedwater sparger end bracket assemblies as well as replacement feedwater sparger end bracket assemblies.

The feedwater spargers of boiling water reactors may be sprung into place during installation such that there is a shear load on the feedwater sparger end welds and the feedwater sparger end bracket assembly welds. One instance in which feedwater spargers are sprung into place involves the installation of replacement feedwater spargers having flow baffles at the feedwater nozzles of the reactor vessel to eliminate thermal shock conditions at the feedwater nozzles. In order for the flow baffles to work effectively, they must remain essentially in contact with the reactor vessel wall. This is assured by the feedwater spargers being sprung into place at installation, resulting in a load on each feedwater sparger end bracket assembly of approximately 8,000 pounds. In the event of a complete through wall crack of the weld between the conduit end and the sparger end plate and/or the weld between the sparger end plate and the attachment plate, causing the feedwater sparger end bracket assembly to become completely detached from the feedwater sparger, the installation preload would be lost and the feedwater sparger would not perform as designed.

A clamp 44 for feedwater sparger end bracket assemblies is illustrated alone in FIGS. 7-12 and installed on the feedwater sparger end bracket assembly 20 in FIGS. 13-20. The clamp 44 includes first and second clamp members 45 and 46, respectively, and a connector 47 such as an externally threaded bolt or screw adjustably connecting the first and second clamp members in spaced relation. Each clamp member is constructed as a single piece or part, such that the clamp 44 consists of the connector 47 and two pieces or parts 45, 46. First clamp member 45 is an upper clamp member, second clamp member 46 is a lower clamp member, and the connector 47 adjustably connects the upper and lower clamp members in vertical spaced relation. The connector 47 extends through vertically aligned bores in the upper and lower clamp members 45 and 46, respectively, and the bores may be threaded to threadably engage a thread on the connector 47. Alternatively or additionally to the bores being threaded, a threaded nut may be provided on an end of the connector 47. Untightening or unthreading connector 47 allows the clamp to be moved from a closed position shown in FIGS. 7 and 8 to an open position in which the vertical spacing between the upper and lower clamp members is increased, thereby allowing installation of the clamp over a feedwater sparger end bracket assembly. If necessary, the connector 47 may be removed entirely from the lower clamp member to facilitate installation of the clamp on the feedwater sparger end bracket assembly as described further below. Tightening or threading connector 47 closes the clamp to decrease or reduce the vertical spacing between the upper and lower clamp members, thereby securing the clamp in the closed position on the feedwater sparger end bracket assembly as described further below.

Figure 7:
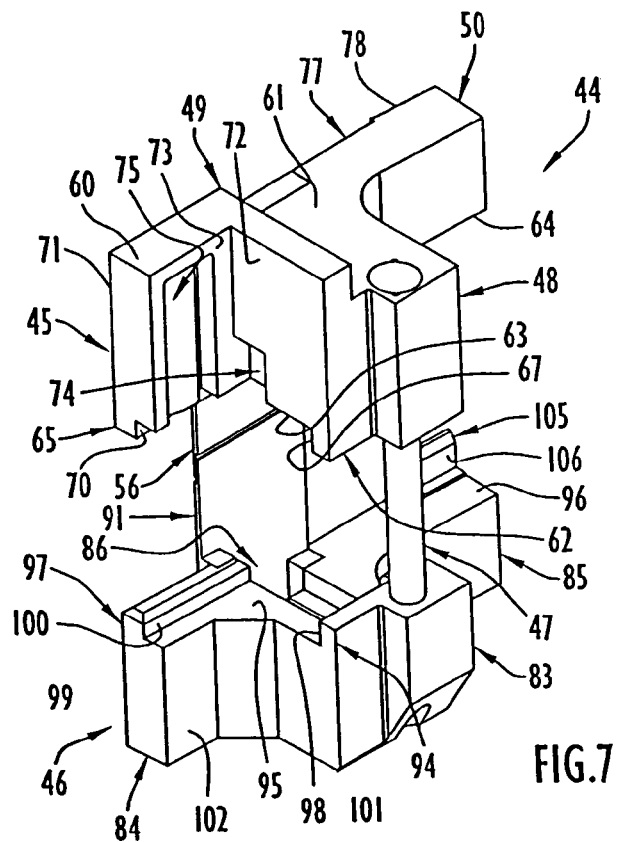
FIG. 7 is a front perspective view of a clamp according to the present invention for use on a feedwater sparger end bracket assembly.

The upper clamp member 45 is a one-piece constructed and comprises a housing having a medial portion 48 between a forward extension 49 and a rearward extension 50 as shown in FIG. 7. The medial portion 48 extends interiorly beyond the forward and rearward extensions 49 and 50, and the bore through which the connector 47 passes extends entirely through the medial portion. The bore extends through the medial portion 48 in the vertical direction and has a central longitudinal axis coaxial with the bore of lower clamp member 46. The forward extension 49 has an L-shaped configuration with a radial extension portion and a horizontal extension portion extending forwardly from the radial extension portion at a right angle.

Figure 8:
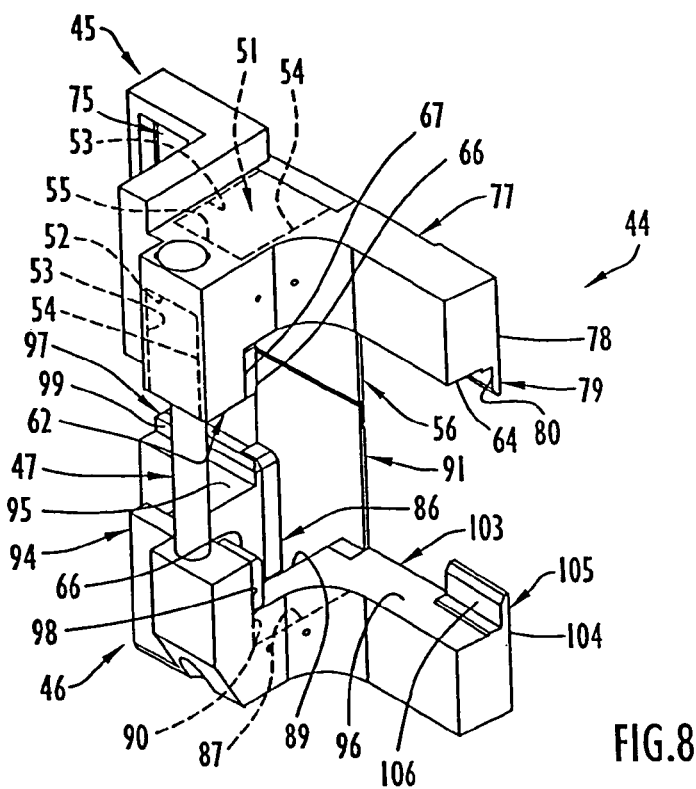
FIG. 8 is a rear perspective view of the clamp illustrated in FIG. 7.

As best shown in FIG. 8, an internal compartment 51 is defined in the upper clamp member 45 and is bounded at the top by a planar internal top wall 52, at the front by a planar internal front wall 53, at the rear by a planar internal rear wall 54 opposing internal front wall 53, at an inner side by a planar internal inner side wall 55, and at an outer side by a planar impingement shield 56 opposing internal inner side wall 55. The internal front and rear walls 53 and 54 are parallel and are perpendicular to internal top wall 52, internal inner side wall 55 and impingement shield 56. The internal inner side wall 55 is parallel to impingement shield 56, and both are perpendicular to internal top wall 52. The compartment 51 is open at the bottom of the upper clamp member, and a mouth or opening along the bottom of the upper clamp member provides communication with the compartment.

The top of upper clamp member 45 has a stepped configuration with forward extension 49 protruding above the medial portion 48 and the rearward extension 50. Accordingly, the forward extension 49 has an external top wall 60 spaced upwardly from an external top wall 61 of medial portion 48 and rearward extension 50. The bottom of upper clamp member 45 has a stepped configuration so as to define a downwardly protruding inner shoulder or protrusion 62 extending downwardly from lower surface 63 and recessed lower surface 64 of upper clamp member 45, and a downwardly protruding outer shoulder or protrusion 65 extending downwardly from the lower surface 63. The lower surface 63 is at the bottom of the upper clamp member and is a forward lower surface located to the front of the opening into compartment 51. The recessed lower surface 64 is at the bottom of the upper clamp member and is a rearward lower surface located to the rear of the opening into compartment 51. The forward and rearward lower surfaces 63 and 64 are planar and parallel to one another, and are perpendicular to the internal front and rear walls 53 and 54, the internal inner side wall 55 and the impingement shield 56. Also, the forward and rearward lower surfaces 63 and 64 are parallel to internal top wall 52.

Figure 20:
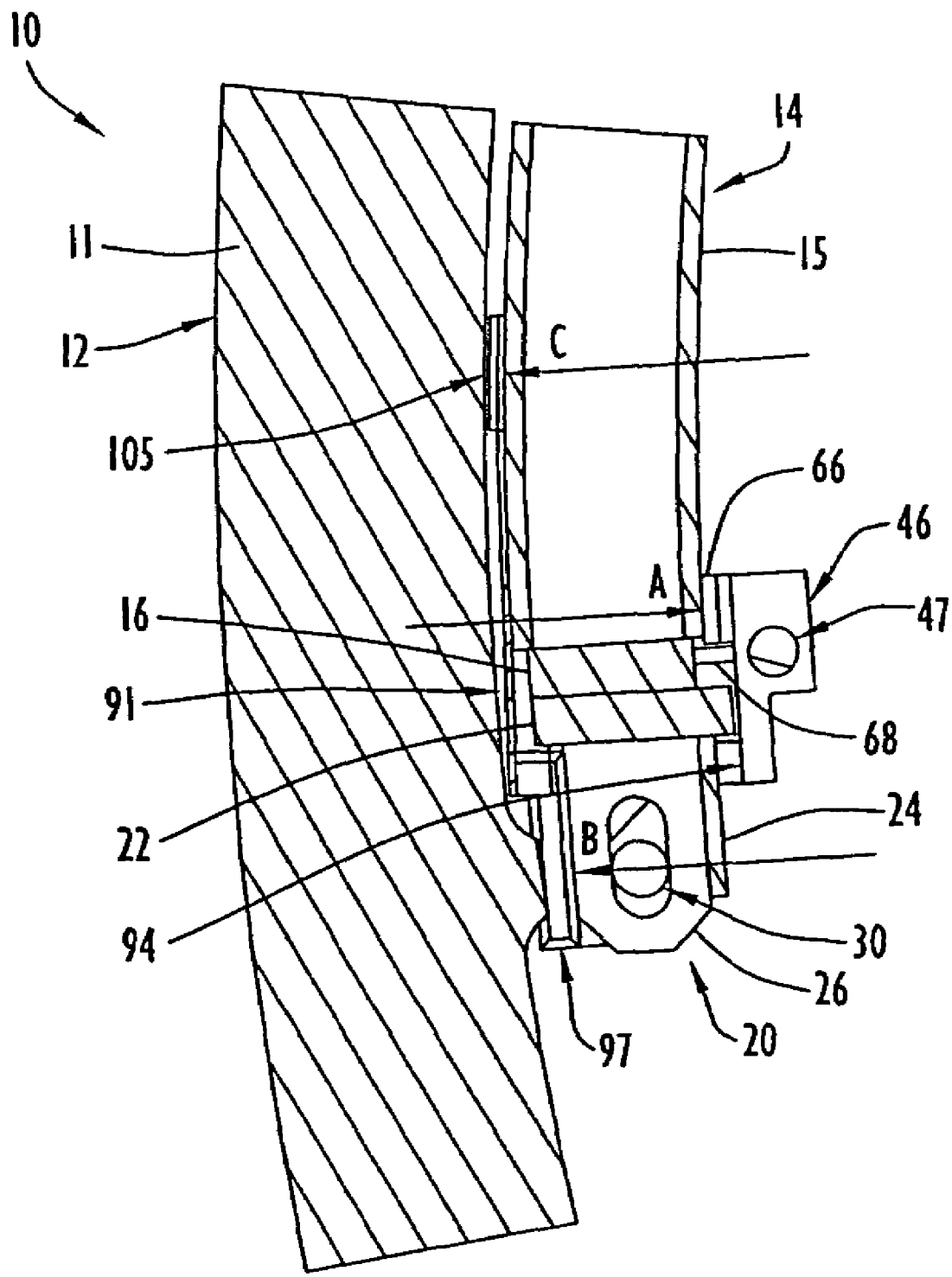
FIG. 20 is a top sectional view depicting the clamp installed on the feedwater sparger end bracket assembly of FIG. 1.

The inner shoulder 62 extends along an inner side of upper clamp member 45 in the horizontal or tangential direction and extends between the front and rear walls of compartment 51. The inner shoulder 62 has a planar outer surface 67, coextensive with internal inner side wall 55, perpendicularly joined to the forward lower surface 63 to the front of the opening into compartment 51 and perpendicularly joined to the rearward lower surface 64 to the rear of the opening into compartment 51. The outer surface 67 of inner shoulder 62 extends downwardly from the opening of compartment 51 and is perpendicular to the internal front and rear walls 53 and 54. A shim pad 66 is secured on the outer surface 67 of inner shoulder 62 and extends vertically between the rearward lower surface 64 and a bottom surface of inner shoulder 62. The shim pad 66 extends forwardly from an external rear wall of medial portion 48 to terminate at a forward edge and has a depth or thickness in the radial direction. The forward edge of shim pad 66 is spaced rearwardly from the internal front wall 53 a sufficient distance for the thickness of the sparger/bracket junction to be accommodated in the compartment 51 between the internal front and rear wall 53 and 54. As best shown in FIG. 20 for the lower clamp member 46, a spacer 68 extends radially outwardly from the internal inner side wall 55 and may be secured to the shim pad 66 and/or to the internal inner side wall 55. The distance that the spacer 68 extends radially outwardly from the internal inner side wall 55 is selected such that the spacer limits the clearance between the upper clamp member 45 and the inner side wall of the conduit of the feedwater sparger as explained further below.

The outer shoulder 65 extends along the horizontal extension portion of forward extension 49 parallel to inner shoulder 62 and has a planar inner surface 70 extending perpendicularly downwardly from the forward lower surface 63, the inner surface 70 being parallel to the outer surface 67 of inner shoulder 62. The outer shoulder 65 extends along the outer side of the upper clamp member opposite the inner side thereof and has a depth in the radial direction between inner surface 70 and a planar external outer surface 71 of forward extension 49. The outer surface 71 extends in a first direction, i.e. forwardly, from the compartment 51 and forms part of the external outer side wall for the upper clamp member 45. The depth of the outer shoulder 65 allows the outer shoulder to be accommodated between the lower bracket member of a feedwater sparger end bracket assembly and the reactor vessel wall as explained further below.

The radial extension portion of forward extension 49 includes a planar external forward wall 72 perpendicularly joined to a planar external inner side wall 73 of the horizontal extension portion at an inside corner. The forward wall 72 has a notch 74 therein adjacent the inside corner at which the forward wall 72 is joined to the inner side wall 73. The forward wall 72 is perpendicularly joined to the forward lower surface 63 along a lower edge of the forward extension, and the notch 74 is located along the lower edge of the forward extension. The notch 74 is open at the front and at the bottom of the radial extension portion. The inner side wall 73 of the horizontal extension portion is parallel to the inner surface 70 of outer shoulder 65 and has a cavity 75 therein of generally rectangular cross-section. The inner side wall 73 is joined to the inner surface 70 of outer shoulder 65 by the forward lower surface 63, the inner side wall 73 being joined to forward lower surface 63 along the lower edge of the forward extension. The cavity 75 is open along the inner side and bottom of the horizontal extension portion, the cavity 75 being open along a lower edge of the horizontal extension portion at which the inner side wall 73 is perpendicularly joined to the forward lower surface 63. The rearward lower surface 64 is recessed upwardly relative to the forward lower surface 63 so that the rearward lower surface 64 is recessed upwardly from the bottom surface of inner shoulder 62 a greater distance than the forward lower surface 63 is recessed upwardly from the bottom surface of the inner shoulder.

The rearward extension 50 is connected to the medial portion 48 at a curved inside corner and includes a straight horizontal segment extending rearwardly in the horizontal direction in alignment with the horizontal extension portion of forward extension 49. The horizontal segment of rearward extension 50 has an external outer side wall 77 coextensive with a downwardly protruding shear tab or protrusion 79 which protrudes downwardly from the rearward lower surface 64 along the outer side of the upper clamp member. The outer side wall 77 forms part of the external outer side wall for the upper clamp member and includes a rearward outer side wall segment along shear tab 79 and a forward outer side wall segment extending forwardly from shear tab 79 to impingement shield 56. The forward and rearward outer side wall segments are planar, with the forward outer side wall segment recessed inwardly from the rearward outer side wall segment. The shear tab 79, which is parallel to inner shoulder 62, begins at an external rear wall of the rearward extension 50 and extends forwardly therefrom along part of the horizontal or tangential length of the outer side of rearward extension 50. Accordingly, the shear tab 79 is spaced from compartment 51 in a second direction, i.e. rearwardly, opposite the direction of extension for outer shoulder 65 such that the inner shoulder 62 is located between the outer shoulder 65 and the shear tab 79 but is disposed closer to the outer shoulder than to the shear tab. The shear tab 79 has a planar outer side surface 78 formed by the rearward outer side wall segment and an inner side surface 80 parallel to the outer side surface 78. The inner side surface 80 is parallel to the outer surface 67 of inner shoulder 62 and is joined to the outer side surface 78 at a tapered lower end of the shear tab 79. The shear tab 79 has a depth or thickness in the radial direction between the outer side surface 78 and the inner side surface 80 and has a location rearward of the compartment 51 to fit between the outer side wall of the feedwater sparger conduit 15 and the reactor vessel wall 11 with a close fit as explained below.

The impingement shield 56 may be formed integrally, unitarily with the housing of the upper clamp member 45 or as a separate component attached to the housing in any suitable manner so that the upper clamp member 45 is a single piece or part. The impingement shield 56 is illustrated as a separate component bolted or screwed to the housing. The impingement shield 56 extends vertically from the top of the upper clamp member 45 to a straight, horizontal lower end 82 best shown in FIG. 9. The impingement shield 56 is planar and has a depth or thickness between planar and parallel inner and outer shield surfaces, the outer shield surface being flush or substantially flush with the forward outer side wall segment of rearward extension 50. The lower end 82 of the impingement shield is of reduced thickness to overlap an upper end of an impingement shield for the lower clamp member 46 as explained further below. The impingement shield 56 completes the external outer side wall of upper clamp member 45 and extends from the outer side wall 77 of rearward extension 50 to the outer surface 71 of forward extension 49 such that the compartment 51 is closed off along the outer side of the upper clamp member. The impingement shield 56 extends vertically below the bottom surface of inner shoulder 62 a sufficient distance to meet the impingement shield of the lower clamp member in the closed position for clamp 44 as described below. The lower clamp member 46 is essentially a mirror image of upper clamp member 45 and is a one-piece construct comprising a housing having a medial portion 83 between a forward extension 84 and a rearward extension 85 as shown in FIG. 7. The medial portion 83 extends interiorly beyond the forward and rearward extensions 84 and 85, and has an external inner side wall including a top portion and a bottom portion angled downwardly from the top portion in the outward direction to meet the bottom wall of the lower clamp member. The bore in lower clamp member 46 through which the connector 47 passes extends entirely through medial portion 83 in the vertical direction. The forward extension 84 has an L-shaped configuration with a radial extension portion and a horizontal extension portion perpendicular to the radial extension portion thereof.

An internal compartment 86, best shown in FIGS. 7 and 8, is defined in the lower clamp member 46 as a counterpart to compartment 51 of the upper clamp member 45. Internal compartment 86 is similar to compartment 51 and is bounded at the bottom by a planar internal bottom wall 87 which is parallel to internal top wall 52, at the front by a planar internal front wall 88 which is co-planar with internal front wall 53, at the rear by a planar internal rear wall 89 which is co-planar with internal rear wall 54, at the inner side by a planar internal inner side wall 90 which is co-planar with internal inner side wall 55, and at the outer side by a planar impingement shield 91 which is co-planar with impingement shield 56. The compartment 86 is open at the top of the lower clamp member and has a mouth or opening along the top of the lower clamp member providing communication with the compartment 86. The opening of compartment 86 is in facing relation to the opening of compartment 51 and is vertically aligned therewith.

The bottom of lower clamp member 46 is defined by a planar external bottom wall. The top of lower clamp member 46 has a stepped configuration defining an upwardly protruding inner shoulder or protrusion 94 extending upwardly from planar upper surface 95 and planar recessed upper surface 96, and an upwardly protruding outer shoulder or protrusion 97 extending upwardly from the upper surface 95. The upper surface 95, which is at the top of the lower clamp member, is located to the front of the opening into compartment 86 and is a forward upper surface. The recessed upper surface 96 is located to the rear of the opening into compartment 86 at the top of the lower clamp member and is a rearward upper surface. The forward upper surface 95 corresponds to the forward lower surface 63 and is parallel to and vertically aligned with the forward lower surface 63. The rearward upper surface 96 corresponds to the rearward lower surface 64 and is parallel to and vertically aligned with the rearward lower surface 64.

The inner shoulder 94 is similar to the inner shoulder 62 and is vertically aligned with the inner shoulder 62. The inner shoulder 94 extends along the inner side of lower clamp member 46 in the tangential or horizontal direction between the front and rear walls of compartment 86 and has a planar outer surface 98 coextensive with internal inner side wall 90, the outer surface 98 being perpendicular to the internal front and rear walls 88 and 89. The outer surface 98 of inner shoulder 94 is perpendicularly joined to forward upper surface 95 to the front of the opening of compartment 86 and is perpendicularly joined to rearward upper surface 96 to the rear of the opening into compartment 86. The outer surface 98 extends upwardly from the opening of compartment 86 and is co-planar with the outer surface 67 of the inner shoulder 62. A shim pad 66 is secured on the outer surface 98 as described above for the upper clamp member 45 and is located at a location corresponding to the shim pad 66 of the upper clamp member. The shim pad 66 of the lower clamp member 46 thusly extends vertically between the rearward upper surface 96 and a top surface of inner shoulder 94. A spacer 68, shown in FIG. 20, extends radially outwardly from the internal inner side wall 90 as described above for the spacer 68 of the upper clamp member. The spacer 68 for the lower clamp member is disposed at a location corresponding to the location for the spacer of the upper clamp member.

The outer shoulder 97 is similar to the outer shoulder 65 and is vertically aligned with the outer shoulder 65. The outer shoulder 97 extends along the horizontal extension portion of forward extension 84 parallel to the inner shoulder 94 and has a planar inner surface 99 extending perpendicularly upwardly from the forward upper surface 95. The inner surface 99 of outer shoulder 97 is parallel to the outer surface 98 of inner shoulder 94, and is co-planar with the inner surface 70 of the outer shoulder 65 of the upper clamp member 45. The outer shoulder 97 extends along the outer side of the lower clamp member in the forward direction from compartment 86, and has a depth in the radial direction between inner surface 99 and a planar external outer surface 100 of the forward extension 84. The outer surface 100 forms part of the external outer side wall for the lower clamp member. The top of outer shoulder 97 and the bottom of outer shoulder 65 may have beveled or chamfered edges.

The radial extension portion of forward extension 84 includes a planar external forward wall 101 joined to a planar external inner side wall 102 of the horizontal extension portion by an angled corner wall. The forward wall 101, the corner wall and the inner side wall 102 are perpendicularly joined to the forward upper surface 95 along an upper edge of the forward extension 84. The rearward upper surface 96 is recessed downwardly relative to the forward upper surface 95 so that the rearward upper surface 96 is recessed downwardly from the top surface of inner shoulder 94 a greater distance than the forward upper surface 95 is recessed downwardly from the top surface of the inner shoulder 94.

The rearward extension 85 is similar to rearward extension 50 and is vertically aligned with the rearward extension 50. The rearward extension 85 has a horizontal segment corresponding to the horizontal segment of rearward extension 50 and has an external outer side wall 103 coextensive with an upwardly protruding shear tab or protrusion 105. The outer side wall 103 forms part of the external outer side wall for the lower clamp member and includes a rearward outer side wall segment along shear tab 105 and a forward outer side wall segment extending forwardly from shear tab 105 to impingement shield 91, with the forward outer side wall segment being recessed inwardly from the rearward outer side wall segment. Shear tab 105 is similar to shear tab 79 and protrudes upwardly from the rearward upper surface 96, the shear tab 105 being disposed at a location corresponding to the location of shear tab 79. Accordingly, the shear tab 105 is spaced from compartment 86 in the rearward direction, opposite the direction of extension for outer shoulder 97, such that the inner shoulder 94 is located between the outer shoulder 97 and the shear tab 105 but is disposed closer to the outer shoulder 97 than to the shear tab 105. The shear tab 105 has a planar outer side surface 104 formed by the rearward outer side wall segment of outer side wall 103 and has an inner side surface 106 parallel to the outer side surface 104. The inner side surface 106 is parallel to the outer surface 98 of inner shoulder 94 and is joined to the outer side surface 104 at a tapered upper end for the shear tab 105 as described for the shear tab 79. The outer side surface 104 of shear tab 105 is co-planar with the outer side surface 78 of shear tab 79. The inner side surface 106 of shear tab 105 is co-planar with the inner side surface 80 of shear tab 79.

Figure 9:
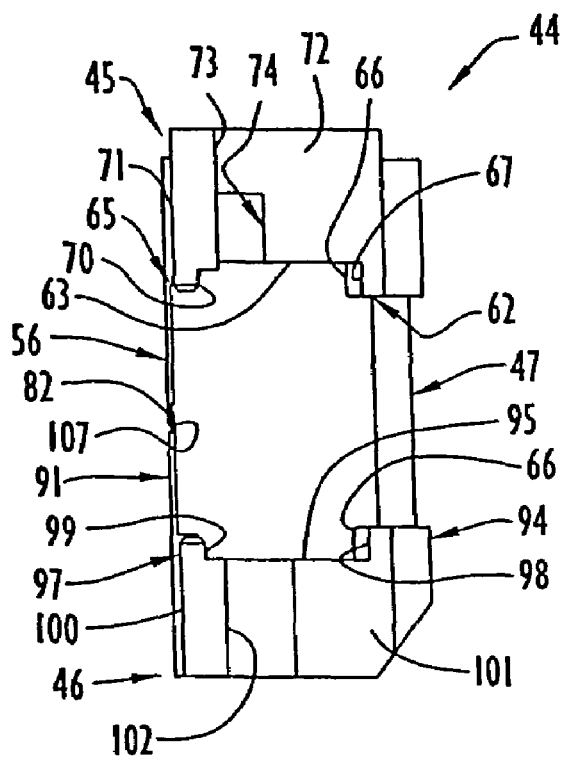
FIG. 9 is a front view of the clamp.
Figure 10:
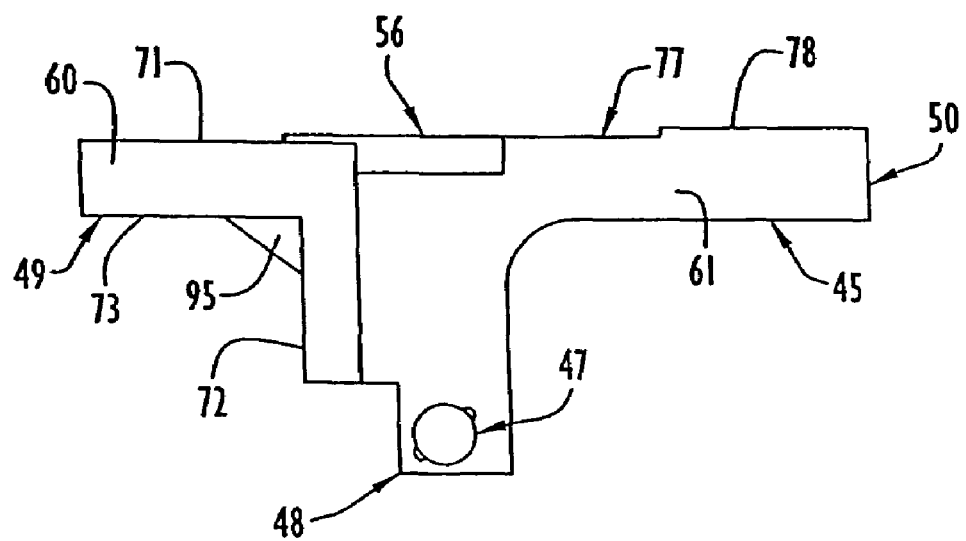
FIG. 10 is a top view of the clamp.
Figure 11:
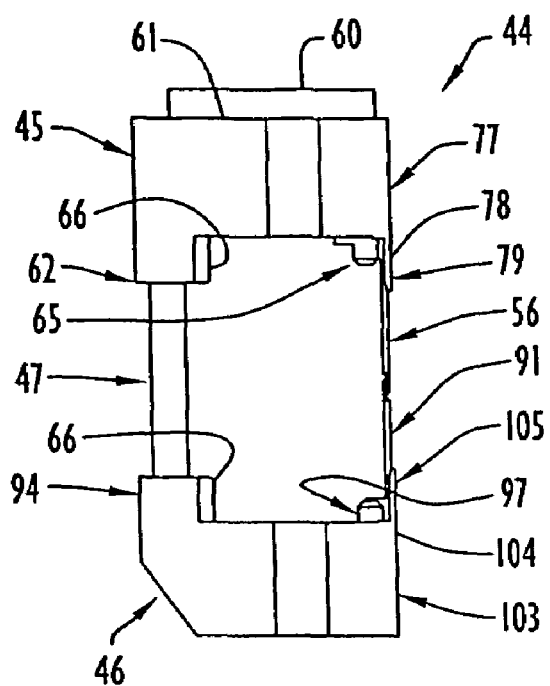
FIG. 11 is a rear view of the clamp.
Figure 12:
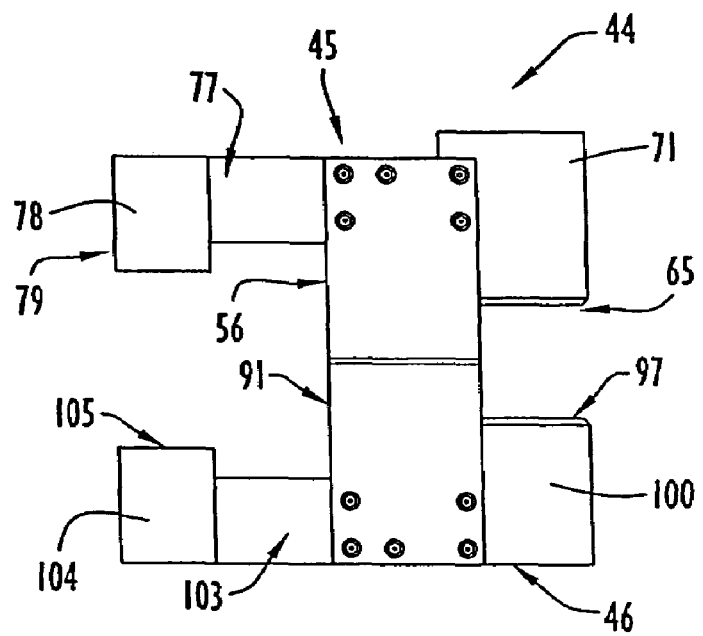
FIG. 12 is an outer side view of the clamp.
Figure 13:
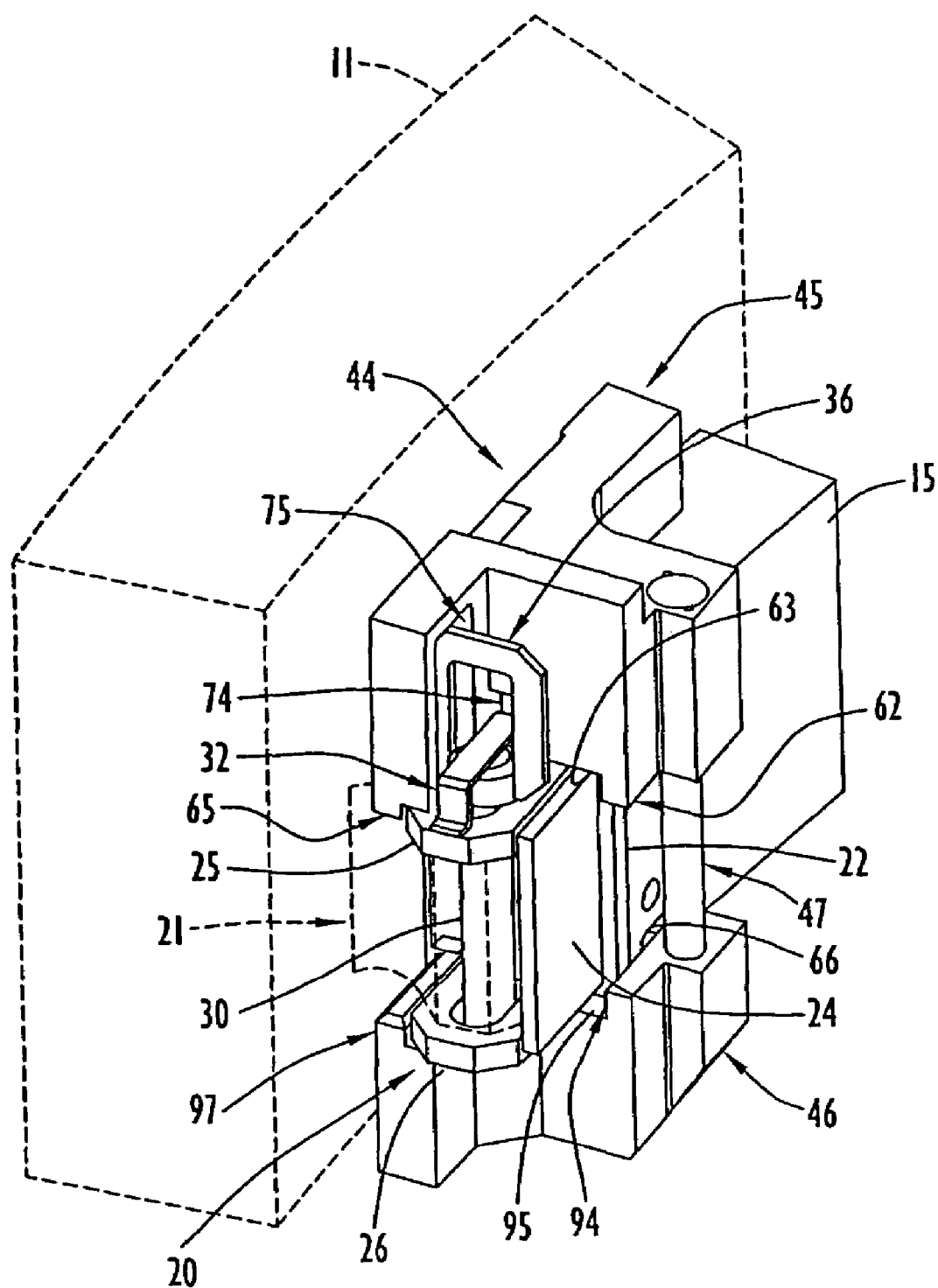
FIG. 13 is a front perspective view of the clamp installed on the feedwater sparger end bracket assembly of FIG. 1.
Figure 14:
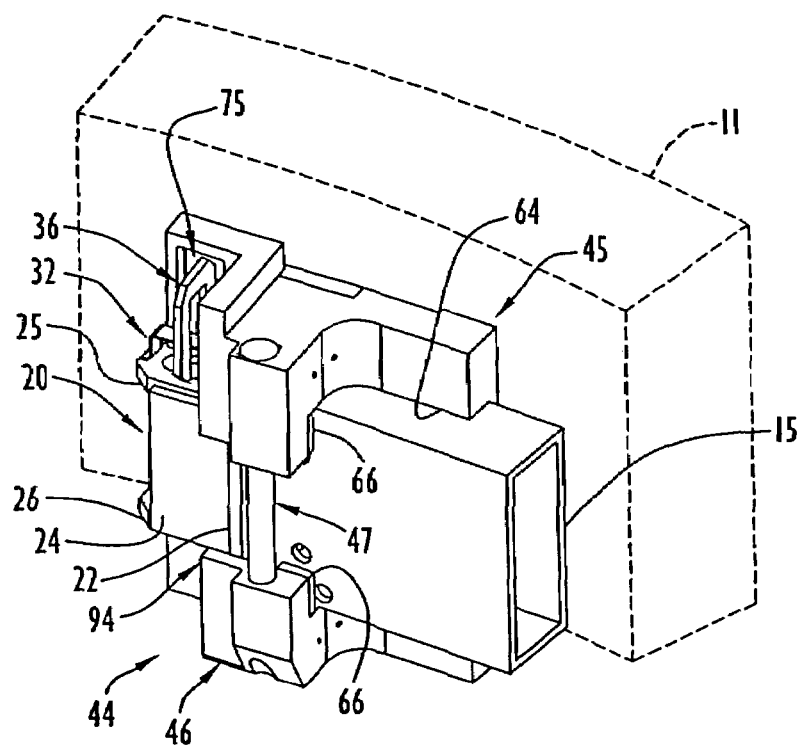
FIG. 14 is an inner side perspective view of the clamp installed on the feedwater sparger end bracket assembly of FIG. 1.
Figure 15:
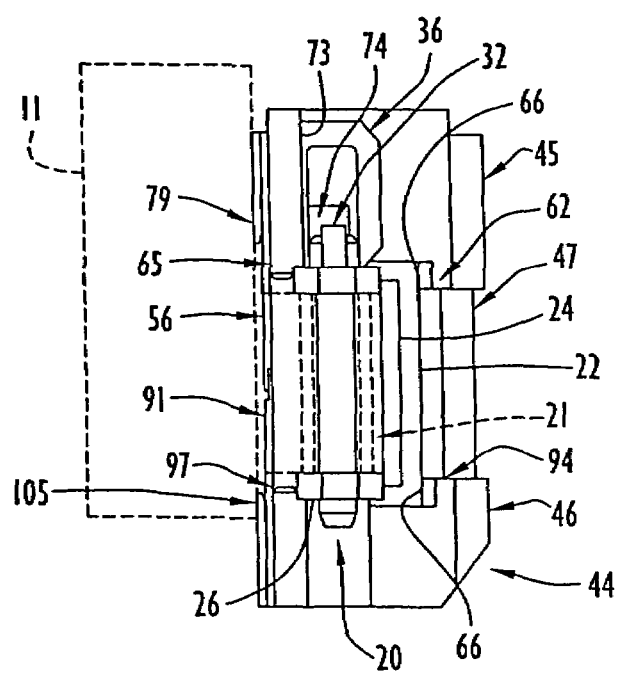
FIG. 15 is a front view of the clamp installed on the feedwater sparger end bracket assembly of FIG. 1.
Figure 16:
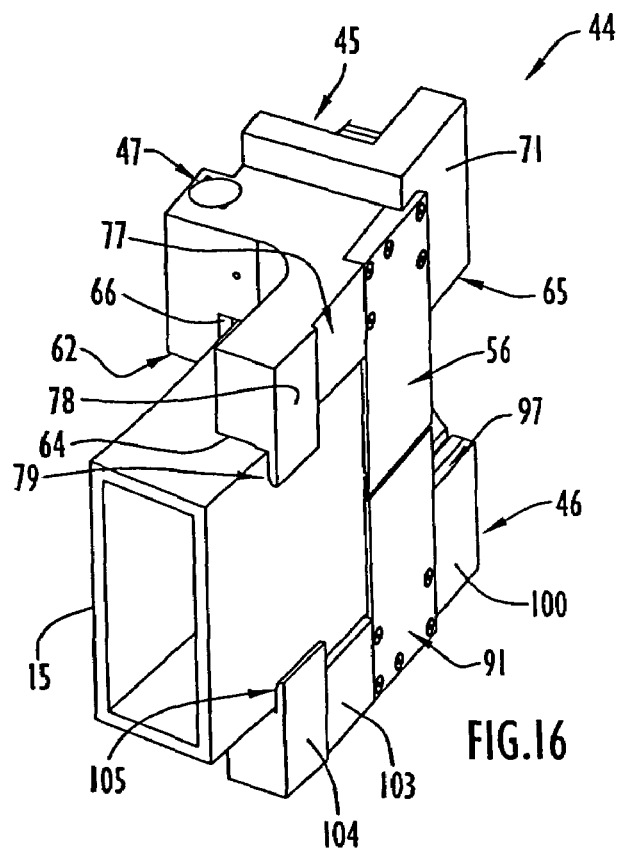
FIG. 16 is a rear perspective view of the clamp installed on the feedwater sparger end bracket assembly of FIG. 1, with the reactor vessel not being shown for the sake of simplicity.
Figure 17:
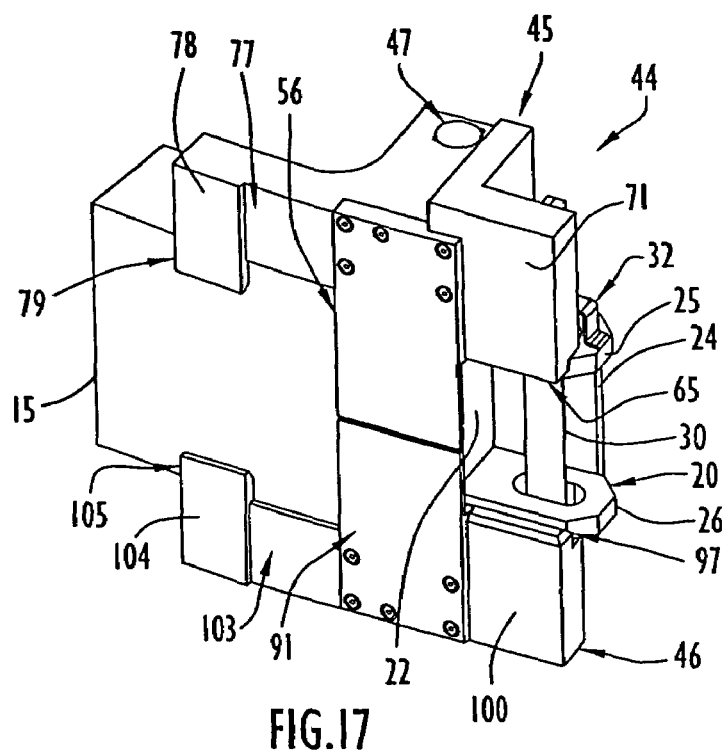
FIG. 17 is an outer side perspective view of the clamp installed on the feedwater sparger end bracket assembly of FIG. 1, with the reactor vessel not being shown for the sake of simplicity.
Figure 18:
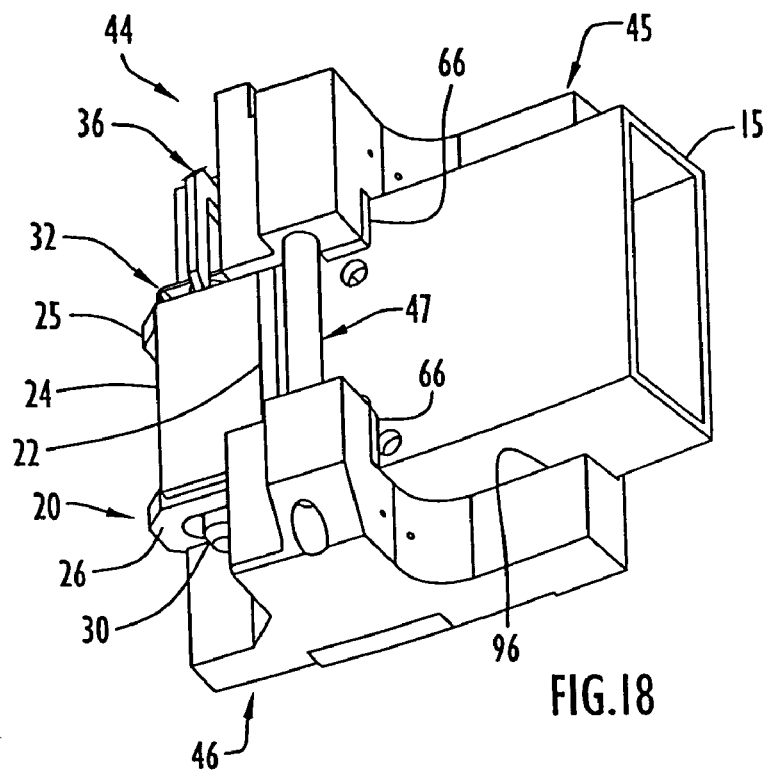
FIG. 18 is a bottom perspective view of the clamp installed on the feedwater sparger end bracket assembly of FIG. 1, with the reactor vessel not being shown for the sake of simplicity.
Figure 19:
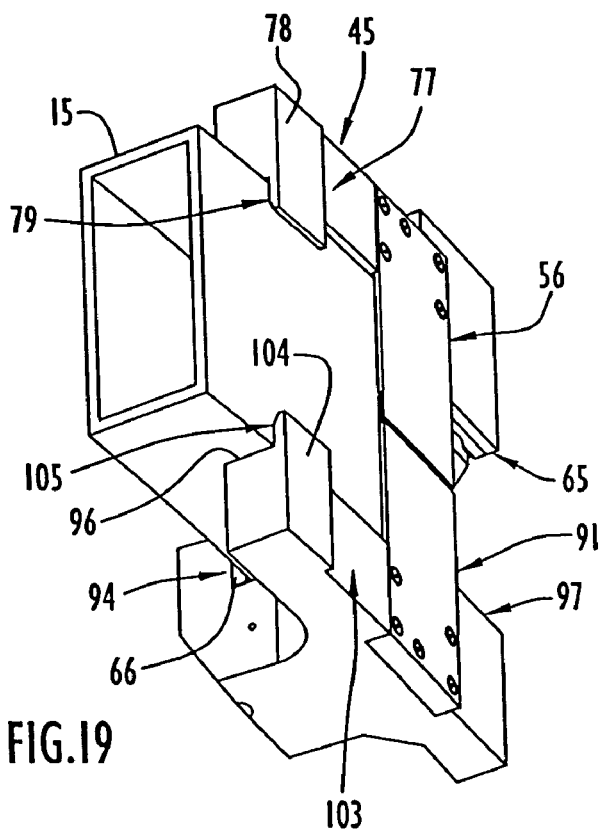
FIG. 19 is a bottom perspective view from a different angle of the clamp installed on the feedwater sparger and bracket assembly of FIG. 1, with the reactor vessel not being shown for the sake of simplicity.

The impingement shield 91 is similar to impingement shield 56 and extends in the vertical direction from the bottom of the lower clamp member 46 to a straight, horizontal upper end 107 best shown in FIG. 9. The upper end 107 is of reduced thickness to overlap the lower end 82 of impingement shield 56 when the clamp 44 is in the closed position as shown in FIG. 9. With the clamp in the closed position, the planar inner surface of shield 56 is flush or substantially flush with a planar inner surface of shield 91, and the planar outer surface of shield 56 is flush or substantially flush with a planar outer surface of shield 91. The impingement shield 91 completes the external outer side wall of lower clamp member 46 and extends from the outer side wall 103 of rearward extension 85 to the outer surface 100 of forward extension 84 such that the compartment 86 is closed off along the outer side of the lower clamp member. The impingement shield 91 extends upwardly above the top surface of inner shoulder 94 such that the upper edge 107 engages the lower edge 82 of impingement shield 56 when the clamp 44 is in the closed position.

The clamp 44 is preferably fabricated primarily from Austenitic 300 series stainless steel. If additional material strength is needed for certain components, XM-19 stainless steel may be used. In a preferred embodiment, the upper and lower clamp members each have a maximum horizontal or tangential dimension of about 16.60 inches and a maximum radial dimension of about 7.75 inches. The upper clamp member has a maximum vertical dimension or height of about 8.00 inches, and the lower clamp member has a maximum vertical dimension or height of about 6.5 inches. The connector is about 1.25 inches in diameter with seven threads per inch and is about 15 inches long including the head thereof.

A method of preventing separation of feedwater sparger end bracket assemblies involves installing the clamp assembly 44 on a feedwater sparger end bracket assembly, such as feedwater sparger end bracket assembly 20, with the clamp being lowered into the reactor vessel 12 using remote tooling. The upper and lower clamp members are moved away from one another and are separated vertically to the extent required to obtain an open position for the clamp, allowing the clamp members to fit over the feedwater sparger and the feedwater sparger end bracket assembly. The upper clamp member 45 is disposed as one piece over the top of the sparger/bracket junction, and the lower clamp member 46 is disposed as one piece below the sparger/bracket junction with the connector 47 located interiorly of the feedwater sparger 14 and the feedwater sparger end bracket assembly 20. Accordingly, the upper and lower clamp members will be disposed in opposition to one another over the feedwater sparger end bracket assembly. An upper portion of the sparger/bracket junction, i.e. upper portions of sparger end plate 16 and attachment plate 22 which protrude upwardly beyond the conduit 15 and the upper bracket member 25, is aligned with the internal compartment 51 of the upper clamp member 45. A lower portion of the sparger/bracket junction, i.e. lower portions of sparger end plate 16 and attachment plate 22 which protrude downwardly beyond the conduit 15 and the lower bracket member 26, is aligned with the internal compartment 86 of lower clamp member 46. Of course, where the sparger/bracket junction includes a shim plate, an upper portion of the shim plate will be aligned with compartment 51 and a lower portion will be aligned with compartment 86. The connector 47 is then threaded into the lower clamp member, and the connector 47 and/or another tool is used to move the respective one-piece constructs of the upper and lower clamp members 45 and 46 toward one another. The upper and lower clamp members 45 and 46 are drawn together to obtain the closed position in which the clamp members enclose the upper and lower portions of the sparger/bracket junction. Since each clamp member is a one-piece construct, only two pieces or parts are required to be moved and drawn together during installation. The upper and lower clamp members are securely tightened on the feedwater sparger 14 and the feedwater sparger end bracket assembly 20, and are held in place via the connector 47. The clamp 44 will then be in a closed position with the lower end 82 of impingement shield 56 in overlapping engagement with the upper end 107 of impingement shield 91. The clamp is then left in place in the reactor vessel 12.

FIGS. 13-20 illustrate the clamp 44 installed on the feedwater sparger end bracket assembly 20 to form a constrained feedwater sparger end bracket assembly, it being noted that the upper clamp member 45 is not shown in FIG. 20. With the clamp 44 installed on the feedwater sparger end bracket assembly 20, the upper portions of sparger end plate 16 and attachment plate 22 are disposed within the compartment 51 of the upper clamp member 45, and the lower portions of sparger end plate 16 and attachment plate 22 are disposed within the compartment 86 of lower clamp member 46. The leg 34 and/or foot 35 of pin retainer 32 disposed closest to the attachment plate 22 is accommodated in the notch 74. An outer side of pin bail 36 is accommodated in the cavity 75. The upper portions of sparger end plate 16 and attachment plate 22, i.e. the upper portion of the sparger/bracket junction, are constrained in a first or horizontal or tangential direction between the internal front wall 53 and the internal rear wall 54 of compartment 51 with a close fit, i.e. with minimal or no clearance therebetween. The lower portions of sparger end plate 16 and attachment plate 22, i.e. the lower portion of the sparger/bracket junction, are constrained in the horizontal or tangential direction with a close fit between the internal front wall 88 and the internal rear wall 89 of compartment 86. Separation of the feedwater sparger end bracket assembly 20 from the end of the feedwater sparger 14 in a horizontal or tangential direction is thusly prevented.

The sparger/bracket junction is constrained in a second or vertical direction due to constraint of the sparger end plate 16 and the attachment plate 22 between the internal top wall 52 of the upper clamp member 45 and the internal bottom wall 87 of the lower clamp member 46. The upper and lower bracket members 25 and 26 are constrained in the vertical direction with a close fit between the forward lower surface 63 of the upper clamp member 45 and the forward upper surface 95 of the lower clamp member 46. The feedwater sparger conduit 15 is constrained in the vertical direction with a close fit between the rearward lower surface 64 of upper clamp member 45 and the rearward upper surface 96 of lower clamp member 46. Accordingly, separation of the feedwater sparger end bracket assembly is prevented in the vertical direction.

The outer shoulder 65 of upper clamp member 45 is disposed between the upper bracket member 25 and the reactor vessel wall 11, with the inner surface 70 of outer shoulder 65 disposed adjacent the outer side edge of the upper bracket member with little or no clearance. The shear tab 79 of the upper clamp member 45 is disposed between the conduit 15 and the reactor vessel wall 11 with a close fit, the inner side surface 80 of the shear tab 79 being adjacent the outer side wall of the conduit with little or no clearance therebetween. The outer shoulder 97 of the lower clamp member 46 is disposed between the lower bracket member 26 and the reactor vessel wall 11, with the inner surface 99 of the outer shoulder 97 adjacent the outer side edge of the lower bracket member with little or no clearance therebetween. The shear tab 105 of the lower clamp member 46 is disposed between the conduit 15 and the reactor vessel wall 11 with a close fit, with the inner side surface 106 of the shear tab 105 adjacent the outer side wall of the conduit with little or no clearance therebetween. The outer surface 67 of inner shoulder 62 of the upper clamp member 45 is adjacent the inner side edge of attachment plate 22 with minimal or no clearance therebetween to establish a tight fit between the upper clamp member and the feedwater sparger end bracket assembly. The shim pad 66 of the upper clamp member 45 fills the gap or space between the outer surface 67 and the inner side wall of conduit 15 to establish a tight fit between the upper clamp member and the feedwater sparger. The spacer 68 of the upper clamp member 45 occupies the gap or space between the outer surface 67 and the inner side edge of the sparger end plate 16 as shown in FIG. 20 for the lower clamp member, thereby further ensuring a tight fit between the upper clamp member and the feedwater sparger. The lower clamp member 46 is installed on the feedwater sparger and bracket assembly in the same manner as the upper clamp member. The outer surface 98 of inner shoulder 94 of the lower clamp member 46 is adjacent the inner side edge of attachment plate 22, and the shim pad 66 of the lower clamp member fills the gap or space between the outer surface 98 and the inner side wall of conduit 15. The spacer 68 of the lower clamp member 46 occupies the gap or space between the outer surface 98 and the inner side edge of the sparger end plate 16 as shown in FIG. 20. Separation of the feedwater sparger end bracket assembly 20 is prevented in the radial direction due to the feedwater sparger end bracket assembly being constrained with a close fit between the inner shoulders 62, 94 and the outer shoulders 65, 97. Also, the feedwater sparger 14 is constrained in the radial direction due to constraint of conduit 15 between the inner shoulders 62, 94 and the outer shoulder 65, 97 via the shim pads 66 and due to radial constraint of the conduit 15 between the inner shoulders 62, 94 and the shear tabs 79, 105 via the shim pads 66.

The impingement shields 56, 91 are disposed between the sparger/bracket junction and the reactor vessel wall 11. The impingement shields 56, 91 isolate the sparger/bracket junction from the vessel wall 11 and prevent direct impingement of feedwater flow on the reactor vessel wall 11 should a through wall crack develop between the conduit 15 and the sparger end plate 16. Accordingly, direct impingement of relatively colder feedwater on the reactor vessel wall 11 with concomitant thermal shock and cracking of the cladding on the interior surface of the reactor vessel wall is avoided. The shear tabs 79, 105 assist in carrying moment on the clamp 44 that occurs in the event of a complete through wall crack of the welds between the conduit 15 and the sparger end plate 16 or between the sparger end plate 16 and the attachment plate 22. In the event that the feedwater spargers are sprung into place such that there is a shear preload on the welds, the preload is maintained by the clamp 44 in the event of weld failure. If either of the welds between the conduit 15 and the sparger end plate 16 or between the sparger end plate 16 and the attachment plate 22 fails, the load from the feedwater sparger is transferred to the clamp 44 at location A shown in FIG. 20. The clamp 44 reacts to this load at location B, and the couple created by the loads at locations A and B creates a moment that must be balanced. The shear tabs 79, 105 react, at location C, to the couple created by the loads at locations A and B such that all loads and moments are balanced. Accordingly, the outer shoulders 65, 97 and the shear tabs 79, 105 cooperate with the inner shoulders 62, 94 to place the clamp and the feedwater sparger in equilibrium. Since the installation preload is transferred to and maintained by the clamp 44, flow baffles of the feedwater sparger will remain essentially in contact with the reactor vessel wall.

Various shims and spacers can be incorporated in the clamp 44 to achieve a tight fit between the clamp and the feedwater sparger and/or the feedwater sparger end bracket assembly, as needed. Various shims and spacers can be incorporated in the clamp 44 to adapt the clamp for installation on feedwater sparger end bracket assemblies having various dimensions and components. The clamp can be installed on feedwater sparger end bracket assemblies having one or more shim plates, such as feedwater sparger end bracket assembly 120, by forming the internal compartments 51, 86 with a distance between the internal front walls and the internal rear walls sufficient to accommodate the sparger end plate, the attachment plate, and any shim plate. A clamp designed for installation on feedwater sparger end bracket assembly 120 can also be installed on the feedwater sparger end bracket assembly 20 by using shims and/or spacers to achieve a close fit between the feedwater sparger end bracket assembly 20 and the clamp. It should be appreciated, therefore, that the clamp 44 can be used on sparger/bracket junctions of different thicknesses. The shims and/or spacers can be incorporated in the clamp at any suitable locations.

The clamp 44 positively secures to the feedwater sparger end bracket assembly and holds the feedwater sparger and the feedwater sparger end bracket assembly together in the event of through wall cracking of any or all feedwater sparger and/or feedwater sparger end bracket assembly welds. The clamp prevents separation of the feedwater sparger end bracket assembly in first, second and third directions, i.e. horizontal or tangential, vertical and radial directions. The clamp prevents separation of the feedwater sparger end bracket assembly from the feedwater sparger and prevents separation of the structural components of the feedwater sparger end bracket assembly. The clamp provides an alternate load path for loads from the feedwater sparger to the reactor vessel attachment fitting, and the outer shoulders and shear tabs provide an alternate path for transferring loads from the feedwater sparger to the reactor vessel attachment fitting. The clamp can be installed remotely from a refueling bridge using long-handled tooling. The clamp incorporates corrosion resistant materials and does not require welding to the feedwater sparger, the feedwater sparger end bracket assembly or to the reactor vessel.

In as much as the present invention is subject to many variations, modifications and changes in detail, it is intended that all subject matter discussed above or shown in the accompanying drawings be interpreted as illustrative only and not be taken in a limiting sense.

What is claimed is:

1. A boiling water reactor vessel having a feedwater sparger with a constrained feedwater sparger end bracket assembly, comprising:
a boiling water reactor vessel having a vessel wall;
a feedwater sparger within said boiling water reactor vessel and including a conduit spaced inwardly from said vessel wall and having a conduit end;
a feedwater sparger end bracket assembly connected to said conduit end at a sparger/bracket junction; and
a clamp disposed on said feedwater sparger end bracket assembly and consisting of a one-piece first clamp member having a first compartment receiving a first portion of said sparger/bracket junction, a one-piece second clamp member, in opposition to said first clamp member, having a second compartment receiving a second portion of said sparger/bracket junction, and a connector securing said first clamp member and said second clamp member on said feedwater sparger end bracket assembly with said first compartment and said second compartment constraining said sparger/bracket junction against separation.

2. The boiling water reactor vessel having a feedwater sparger with a constrained feedwater sparger end bracket assembly as recited in claim 1 wherein:
said first clamp member includes a pair of spaced shoulders;
said second clamp member includes a pair of spaced shoulders; and
said feedwater sparger end bracket assembly is disposed and constrained between said shoulders of said first clamp member and between said shoulders of said second clamp member.

3. The boiling water reactor vessel having a feedwater sparger with a constrained feedwater sparger end bracket assembly as recited in claim 1 wherein:
said first clamp member includes a first shoulder disposed between said feedwater sparger end bracket assembly and said vessel wall, a tab spaced from said shoulder and disposed between said conduit and said vessel wall, and a second shoulder spaced inwardly from said first shoulder and from said tab, said second shoulder being disposed between said first shoulder and said tab;
said second clamp member includes a first shoulder disposed between said feedwater sparger end bracket assembly and said vessel wall, a tab spaced from said first shoulder of said second clamp member and disposed between said conduit and said vessel wall, and a second shoulder spaced inwardly from said first shoulder of said second clamp member and from said tab of said second clamp member, said second shoulder of said second clamp member being disposed between said first shoulder of said second clamp member and said tab of said second clamp member;
said feedwater sparger end bracket assembly is disposed and constrained between said first shoulders and said second shoulders; and
said conduit is disposed and constrained between said second shoulders and said tabs.

4. The boiling water reactor vessel having a feedwater sparger with a constrained feedwater sparger end bracket assembly as recited in claim 1 wherein:
said sparger/bracket junction comprises an end plate at said conduit end, and an attachment plate of said feedwater sparger end bracket assembly secured to said end plate;
said first portion of said sparger/bracket junction comprises first portions of said end plate and said attachment plate received together in said first compartment; and
said second portion of said sparger/bracket junction comprises second portions of said end plate and said attachment plate received together in said second compartment.

5. The boiling water reactor vessel having a feedwater sparger with a constrained feedwater sparger end bracket assembly as recited in claim 4 wherein said sparger/bracket junction further comprises a shim plate disposed between said end plate and said attachment plate.

6. A boiling water reactor vessel having a feedwater sparger with a constrained feedwater sparger end bracket assembly comprising:
a boiling water reactor vessel having a vessel wall;
a feedwater sparger within said boiling water reactor vessel and including a conduit spaced inwardly from said vessel wall and having a conduit end;
a feedwater sparger end bracket assembly connected to said conduit end at a sparger/bracket junction having an upper portion and a lower portion; and
a clamp secured on said sparger/bracket junction and consisting of a one-piece upper clamp member, a one-piece lower clamp member, and a connector securing said clamp members on said sparger/bracket junction;
said upper clamp member having an upper clamp member compartment receiving said upper portion of said sparger/bracket junction between opposed internal walls of said compartment to constrain said feedwater sparger end bracket assembly in a first direction, having an internal top wall of said compartment disposed over said upper portion to constrain said feedwater sparger end bracket assembly in a second direction, and having inner and outer shoulders receiving said feedwater sparger end bracket assembly therebetween to constrain said feedwater sparger end bracket assembly in a third direction; and
said lower clamp member having a lower clamp member compartment receiving said lower portion of said sparger/bracket junction between opposed internal walls of said lower clamp member compartment to constrain said feedwater sparger end bracket assembly in said first direction, having an internal bottom wall of said lower clamp member compartment disposed beneath said lower portion to constrain said feedwater sparger end bracket assembly in said second direction, and having inner and outer shoulders receiving said feedwater sparger end bracket assembly therebetween to constrain said feedwater sparger end bracket assembly in said third direction.

7. The boiling water reactor vessel having a feedwater sparger with a constrained feedwater sparger end bracket assembly as recited in claim 6 wherein:
said first direction is horizontal to said vessel;
said second direction is vertical to said vessel; and
said third direction is radial to said vessel.

8. The boiling water reactor vessel having a feedwater sparger with a constrained feedwater sparger end bracket assembly as recited in claim 6 wherein said sparger/bracket junction comprises:
an end plate at said conduit end; and
an attachment plate of said feedwater sparger end bracket assembly secured to said end plate.

9. The boiling water reactor vessel having a feedwater sparger with a constrained feedwater sparger end bracket assembly as recited in claim 8 wherein said sparger/bracket junction further comprises a shim plate between said end plate and said attachment plate.

10. The boiling water reactor vessel having a feedwater sparger with a constrained feedwater sparger end bracket assembly as recited in claim 6 wherein:
    said upper clamp member further comprises a shear tab disposed between said conduit and said vessel wall; and
    said lower clamp member further comprises a shear tab disposed between said conduit and said vessel wall.

11. The boiling water reactor vessel having a feedwater sparger with a constrained feedwater sparger end bracket assembly as recited in claim 10 wherein:
    said shoulders are located on one side of said sparger/bracket junction; and
    said shear tabs are located on an opposite side of said sparger/bracket junction.

12. The boiling water reactor vessel having a feedwater sparger with a constrained feedwater sparger end bracket assembly as recited in claim 6 wherein said connector draws said clamp members toward one another in said second direction.

13. A boiling water reactor vessel having a feedwater sparger with a constrained feedwater sparger end bracket assembly comprising
    a boiling water reactor vessel including a vertically extending vessel wall of cylindrical curvature;
    a feedwater sparger within said vessel and including a circumferentially extending conduit spaced inwardly from said vessel wall and having a conduit end;
    a feedwater sparger end bracket assembly connected to said vessel wall and to said conduit end, said feedwater sparger end bracket assembly being connected to said conduit end at a sparger/bracket junction, said sparger/bracket junction comprising a planar end plate at said conduit end, and a planar attachment plate of said feedwater sparger end bracket assembly connected to said end plate in parallel relation with said end plate, said end plate and said attachment plate extending vertically within said vessel; and
    a clamp secured on said sparger/bracket junction and consisting of a one-piece upper clamp member, a one-piece lower clamp member and a connector securing said clamp members on said sparger/bracket junction;
    said upper clamp member having an upper clamp member compartment receiving upper portions of said end plate and said attachment plate together between opposed internal walls of said compartment to constrain said feedwater sparger end bracket assembly in a direction horizontal to said vessel, having an internal top wall of said compartment disposed over said upper portions of said end plate and said attachment plate to constrain said feedwater sparger end bracket assembly in a direction vertical to said vessel and having inner and outer shoulders receiving said feedwater sparger end bracket assembly therebetween to constrain said feedwater sparger end bracket assembly in a direction radial to said vessel;
    said lower clamp member having a lower clamp member compartment receiving lower portions of said end plate and said attachment plate together between opposed internal walls of said lower clamp member compartment to constrain said feedwater sparger end bracket assembly in said direction horizontal to said vessel, having an internal bottom wall of said lower clamp member compartment disposed beneath said lower portions of said end plate and said attachment plate to constrain said feedwater sparger end bracket assembly in said direction vertical to said vessel, and having inner and outer shoulders receiving said feedwater sparger end bracket assembly therebetween to constrain said feedwater sparger end bracket assembly in said direction radial to said vessel; and
    said connector drawing said clamp members toward one another in said direction vertical to said vessel.

14. The boiling water reactor vessel having a feedwater sparger with a constrained feedwater sparger end bracket assembly as recited in claim 13 wherein said end plate is welded to said attachment plate.

15. The boiling water reactor vessel having a feedwater sparger with a constrained feedwater sparger end bracket assembly as recited in claim 13 wherein said sparger/bracket junction further comprises a shim plate disposed between and welded to said end plate and said attachment plate.

16. The boiling water reactor vessel having a feedwater sparger with a constrained feedwater sparger end bracket assembly as recited in claim 13 wherein:
    said attachment plate has a rearward face connected to said end plate and has a forward face opposite said rearward face;
    said reactor vessel further comprises an attachment fitting extending inwardly from said vessel wall; and
    said feedwater sparger end bracket assembly further comprises an upper bracket member extending from said forward face, a lower bracket member extending from said forward face in the same direction as said upper bracket member with said fitting disposed between said bracket members, and a pin extending through said bracket members and said fitting;
    said outer shoulder of said upper clamp member being disposed between said upper bracket member and said vessel wall; and
    said outer shoulder of said lower clamp member being disposed between said lower bracket member and said vessel wall.

17. The boiling water reactor vessel having a feedwater sparger with a constrained feedwater sparger end bracket assembly as recited in claim 16 wherein:
    said upper clamp member further comprises a shear tab disposed between said conduit and said vessel wall; and
    said lower clamp member further comprises a shear tab disposed between said conduit and said vessel wall.

18. The boiling water reactor vessel having a feedwater sparger with a constrained feedwater sparger end bracket assembly as recited in claim 16 wherein:
    said inner shoulders are adjacent said attachment plate;
    said upper clamp member further comprises a shim pad disposed between said conduit and said inner shoulder of said upper clamp member; and
    said lower clamp member further comprises a shim pad disposed between said conduit and said inner shoulder of said lower clamp member.

19. The boiling water reactor vessel having a feedwater sparger with a constrained feedwater sparger end bracket assembly as recited in claim 18 wherein:
    said upper clamp member further comprises a spacer disposed between said end plate and said inner shoulder of said upper clamp member; and said lower clamp member further comprises a spacer disposed between said end plate and said inner shoulder of said lower clamp member.

20. The boiling water reactor vessel having feedwater sparger with a constrained feedwater sparger end bracket assembly as recited in claim 16 wherein;

said upper clamp member further comprises an impingement shield extending downwardly toward said lower clamp member;

said lower clamp member further comprises an impingement shield extending upwardly toward said upper clamp member; and said impingement shields are in overlapping engagement and are disposed between said sparger/bracket junction and said vessel wall.

* * * * *